United States Patent
Sautter et al.

(10) Patent No.: US 10,583,784 B2
(45) Date of Patent: *Mar. 10, 2020

(54) CROSSBAR CLAMP DEVICES

(71) Applicant: Yakima Products, Inc., Lake Oswego, OR (US)

(72) Inventors: Chris Sautter, Portland, OR (US); John Mark Elliott, Beaverton, OR (US); Dave Condon, Beaverton, OR (US)

(73) Assignee: Yakima Products, Inc., Lake Oswego, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/215,487

(22) Filed: Dec. 10, 2018

(65) Prior Publication Data

US 2019/0217786 A1     Jul. 18, 2019

Related U.S. Application Data

(63) Continuation of application No. 15/201,387, filed on Jul. 2, 2016, now Pat. No. 10,150,423, which is a
(Continued)

(51) Int. Cl.
*B60R 9/048* (2006.01)
*B60R 9/10* (2006.01)
(Continued)

(52) U.S. Cl.
CPC .............. *B60R 9/048* (2013.01); *B60R 9/045* (2013.01); *B60R 9/055* (2013.01); *B60R 9/10* (2013.01)

(58) Field of Classification Search
CPC ......... B60R 9/048; B60R 9/045; B60R 9/055; B60R 9/10
(Continued)

(56) References Cited

U.S. PATENT DOCUMENTS

| 1,789,458 A | 1/1931 | Bureau |
| 2,248,170 A | 7/1941 | Hansen |

(Continued)

FOREIGN PATENT DOCUMENTS

| CN | 24445963 Y | 9/2001 |
| CN | 2902805 Y | 5/2007 |

(Continued)

OTHER PUBLICATIONS

The International Bureau of WIPO, International Search Report and Written Opinion of the International Searching Authority regarding PCT Patent Application No. PCT/US2010/038704, dated Nov. 30, 2010, 12 pages.

(Continued)

*Primary Examiner* — Justin M Larson
(74) *Attorney, Agent, or Firm* — Kolisch Hartwell, P.C.

(57) ABSTRACT

Racks are used to carry cargo on top of vehicles. Racks include crossbars and assemblies configured to secure specific cargo items to the crossbars. Clamps for connecting cargo-specific assemblies to the crossbars, include first and second jaws, and an adjustment device for selectively controlling horizontal relative movement between the jaws.

4 Claims, 16 Drawing Sheets

Related U.S. Application Data continuation of application No. 14/451,348, filed on Aug. 4, 2014, now Pat. No. 9,381,866, which is a continuation of application No. 14/030,050, filed on Sep. 18, 2013, now abandoned, which is a continuation of application No. 12/816,121, filed on Jun. 15, 2010, now abandoned.

(60) Provisional application No. 61/187,197, filed on Jun. 15, 2009.

(51) Int. Cl.
*B60R 9/045* (2006.01)
*B60R 9/055* (2006.01)

(58) Field of Classification Search
USPC .......................................................... 224/319
See application file for complete search history.

(56) References Cited

U.S. PATENT DOCUMENTS

| | | | |
|---|---|---|---|
| 2,302,300 A | 11/1942 | Davies | |
| 2,480,353 A * | 8/1949 | Bjork | B60P 3/1008 224/315 |
| 2,536,797 A | 1/1951 | Cooke | |
| 2,551,218 A | 5/1951 | Menne | |
| 2,573,187 A | 10/1951 | Désilets | |
| 2,723,005 A | 11/1955 | Wink | |
| 2,729,499 A | 1/1956 | Eggum | |
| 2,816,672 A | 12/1957 | Facchini | |
| 2,988,253 A | 6/1961 | Menghi | |
| 3,001,679 A | 9/1961 | Canning et al. | |
| 3,042,240 A | 7/1962 | Cline | |
| 3,113,642 A | 12/1963 | Lay | |
| 3,155,249 A | 11/1964 | Johnson | |
| 3,186,569 A | 6/1965 | Roux | |
| 3,190,587 A | 6/1965 | Fries | |
| 3,209,970 A * | 10/1965 | Canell | B60R 9/12 224/319 |
| 3,276,085 A | 10/1966 | Spranger | |
| 3,460,694 A | 8/1969 | Simms | |
| 3,469,810 A | 9/1969 | Dorris | |
| 3,594,706 A * | 7/1971 | Sotolongo | H01R 4/40 439/520 |
| 3,596,788 A | 8/1971 | Willie | |
| 3,642,157 A | 2/1972 | Williams, Jr. | |
| 3,737,083 A | 6/1973 | Lund | |
| 3,740,034 A | 6/1973 | Scroggins | |
| 3,777,922 A | 12/1973 | Kirchmeyer | |
| 3,826,390 A | 7/1974 | Watson | |
| 3,828,993 A | 8/1974 | Carter | |
| 3,861,533 A | 1/1975 | Radek | |
| 3,892,455 A * | 7/1975 | Sotolongo | H01R 4/44 439/100 |
| 3,946,917 A | 3/1976 | Crawford et al. | |
| 3,976,213 A | 8/1976 | Ball | |
| 3,993,167 A | 11/1976 | Reed | |
| 4,022,362 A | 5/1977 | Revercomb | |
| 4,023,761 A | 5/1977 | Molis | |
| 4,034,879 A | 7/1977 | Cudmore | |
| 4,058,243 A | 11/1977 | Tappan | |
| 4,081,118 A | 3/1978 | Mason | |
| 4,085,763 A | 4/1978 | Thomas | |
| 4,278,192 A * | 7/1981 | Sazegar | B60R 9/12 224/315 |
| 4,326,655 A | 4/1982 | Gradek et al. | |
| 4,350,380 A | 9/1982 | Williams | |
| 4,358,037 A | 11/1982 | Heideman | |
| 4,402,442 A | 9/1983 | Martino | |
| 4,589,622 A | 5/1986 | Hutter | |
| 4,630,990 A | 12/1986 | Whiting | |
| 4,717,165 A | 1/1988 | Johnson | |
| 4,751,891 A | 6/1988 | Wilson | |
| 4,817,838 A | 4/1989 | Kamaya | |
| 4,830,249 A | 5/1989 | Mirenda et al. | |
| 4,848,794 A | 7/1989 | Mader et al. | |
| 4,877,169 A * | 10/1989 | Grim | B60R 9/058 224/331 |
| 4,892,279 A | 1/1990 | Lafferty et al. | |
| 4,895,096 A | 1/1990 | Goodwin et al. | |
| 4,960,356 A | 10/1990 | Wrenn | |
| 4,961,524 A | 10/1990 | Hunts | |
| 4,976,123 A | 12/1990 | Ceron et al. | |
| 4,997,332 A | 3/1991 | Johnson | |
| 5,104,020 A * | 4/1992 | Arvidsson | B60R 9/058 224/322 |
| 5,118,020 A | 6/1992 | Piretti | |
| 5,119,654 A | 6/1992 | Ceron et al. | |
| 5,123,147 A | 6/1992 | Blair | |
| 5,131,669 A | 7/1992 | Kinnamon et al. | |
| 5,136,709 A | 8/1992 | Shirakabe et al. | |
| 5,137,195 A | 8/1992 | Walter | |
| 5,181,639 A * | 1/1993 | Kvanna | B60R 9/055 224/319 |
| 5,215,233 A | 6/1993 | Baldeck | |
| 5,217,149 A | 6/1993 | Simonett | |
| 5,226,570 A * | 7/1993 | Pedrini | B60R 9/058 224/315 |
| 5,275,320 A * | 1/1994 | Duemmler | B60R 9/045 224/319 |
| 5,346,355 A | 9/1994 | Riemer | |
| 5,360,150 A | 11/1994 | Praz | |
| 5,388,938 A | 2/1995 | Helton | |
| 5,397,042 A * | 3/1995 | Pedrini | B60R 9/058 224/315 |
| 5,416,957 A | 5/1995 | Renzi, Sr. et al. | |
| 5,419,479 A * | 5/1995 | Evels | B60R 9/045 224/309 |
| 5,442,840 A | 8/1995 | Ewald | |
| 5,445,300 A | 8/1995 | Eipper et al. | |
| 5,456,396 A | 10/1995 | Allen | |
| 5,492,258 A | 2/1996 | Brunner | |
| 5,516,017 A | 5/1996 | Arvidsson | |
| 5,526,971 A | 6/1996 | Despain | |
| 5,535,930 A | 7/1996 | Lee | |
| 5,582,044 A | 12/1996 | Bolich | |
| 5,598,959 A | 2/1997 | Lorensen et al. | |
| 5,617,617 A | 4/1997 | Gustin | |
| 5,628,336 A | 5/1997 | Lee | |
| 5,647,522 A | 7/1997 | Routh | |
| 5,657,913 A * | 8/1997 | Cucheran | B60R 9/12 224/309 |
| D386,145 S | 11/1997 | Staller | |
| 5,692,659 A | 12/1997 | Reeves | |
| 5,701,628 A | 12/1997 | Morad | |
| 5,738,258 A | 4/1998 | Farrow et al. | |
| 5,758,810 A * | 6/1998 | Stapleton | B60R 9/045 224/321 |
| 5,769,291 A | 6/1998 | Chasan | |
| 5,769,292 A * | 6/1998 | Cucheran | B60R 9/045 224/319 |
| 5,775,557 A | 7/1998 | Arvidsson | |
| 5,779,119 A | 7/1998 | Talbot et al. | |
| 5,806,735 A * | 9/1998 | Christiansson | B60R 9/045 224/319 |
| 5,810,226 A | 9/1998 | Lee | |
| 5,833,074 A | 11/1998 | Phillips | |
| 5,845,828 A * | 12/1998 | Settelmayer | B60R 9/045 224/321 |
| 5,868,621 A | 2/1999 | Parsons | |
| 5,937,488 A * | 8/1999 | Geiger | F16L 3/1033 24/16 PB |
| 5,951,231 A | 9/1999 | Allen | |
| 5,992,805 A | 11/1999 | Tanner | |
| 5,996,736 A * | 12/1999 | Stankiewicz | B60R 9/0485 182/127 |
| 6,015,074 A | 1/2000 | Snavely et al. | |
| 6,053,336 A | 4/2000 | Reeves | |
| 6,112,965 A * | 9/2000 | Lundgren | B60R 9/045 224/322 |
| 6,131,781 A | 10/2000 | Murray | |

(56) References Cited

U.S. PATENT DOCUMENTS

| | | | | |
|---|---|---|---|---|
| 6,164,507 A | * | 12/2000 | Dean | B60R 9/08 224/319 |
| 6,189,868 B1 | | 2/2001 | Santelli, Jr. | |
| 6,193,252 B1 | | 2/2001 | Lin | |
| 6,273,311 B1 | * | 8/2001 | Pedrini | B60R 9/045 224/321 |
| 6,283,310 B1 | | 9/2001 | Dean et al. | |
| 6,357,643 B1 | | 3/2002 | Janner et al. | |
| 6,370,741 B1 | * | 4/2002 | Lu | A47B 21/045 24/523 |
| 6,385,822 B1 | | 5/2002 | Dean et al. | |
| 6,422,441 B1 | * | 7/2002 | Settelmayer | B60R 9/048 224/324 |
| 6,439,397 B1 | | 8/2002 | Reeves | |
| 6,460,743 B2 | | 10/2002 | Edgerly et al. | |
| 6,494,351 B1 | | 12/2002 | Dean | |
| 6,561,398 B1 | | 5/2003 | Cole et al. | |
| 6,568,644 B2 | * | 5/2003 | Pedersen | B62J 7/08 224/309 |
| 6,622,898 B1 | | 9/2003 | Wang | |
| 6,681,971 B2 | * | 1/2004 | Laverack | B60R 9/045 224/319 |
| 6,715,653 B2 | | 4/2004 | DeCosta | |
| 6,766,929 B2 | * | 7/2004 | Karlsson | B60R 9/045 224/315 |
| 6,793,186 B2 | | 9/2004 | Pedersen | |
| 6,868,998 B2 | | 3/2005 | Dean | |
| 6,918,521 B2 | * | 7/2005 | Settelmayer | B60R 9/055 224/319 |
| 6,972,042 B2 | | 12/2005 | Benson | |
| 6,976,857 B1 | * | 12/2005 | Shukla | H01R 4/46 439/100 |
| 7,000,811 B2 | | 2/2006 | Gilstrap et al. | |
| 7,036,698 B2 | | 5/2006 | Allen | |
| 7,044,347 B1 | | 5/2006 | Pedrini | |
| 7,051,909 B2 | | 5/2006 | Gibson | |
| 7,131,561 B2 | | 11/2006 | Humes | |
| 7,234,617 B2 | * | 6/2007 | Weaver | B60R 9/048 224/315 |
| 7,357,283 B2 | * | 4/2008 | Settelmayer | B60R 9/048 224/319 |
| 7,367,481 B2 | * | 5/2008 | Barbara | B60R 9/045 224/319 |
| 7,416,098 B2 | * | 8/2008 | Settelmayer | B60R 9/058 224/309 |
| 7,503,470 B2 | * | 3/2009 | Settelmayer | B60R 9/055 224/309 |
| 7,726,528 B2 | | 6/2010 | Foley | |
| 8,020,737 B2 | | 9/2011 | Sweeney | |
| 8,021,169 B1 | * | 9/2011 | Smith | H01R 4/36 439/100 |
| 8,074,851 B2 | * | 12/2011 | Settelmayer | B60R 9/058 224/309 |
| 8,136,708 B2 | * | 3/2012 | Sautter | B60R 9/08 224/282 |
| 8,136,709 B2 | * | 3/2012 | Jeli | B60R 9/12 224/316 |
| 8,210,407 B2 | * | 7/2012 | Sautter | B60R 9/048 224/315 |
| 8,245,893 B2 | * | 8/2012 | Sautter | B60R 9/08 224/310 |
| 8,393,508 B2 | * | 3/2013 | Sautter | B60R 9/055 224/321 |
| 8,444,033 B2 | * | 5/2013 | Brochier | B60R 9/048 224/315 |
| 8,496,145 B2 | * | 7/2013 | Sautter | B60R 9/045 224/319 |
| 8,556,146 B2 | * | 10/2013 | Sautter | B60R 9/08 224/325 |
| 9,381,866 B2 | * | 7/2016 | Sautter | B60R 9/045 |
| 10,150,423 B2 | * | 12/2018 | Sautter | B60R 9/045 |
| 2002/0125282 A1 | | 9/2002 | Laverack | B60R 9/045 224/319 |
| 2003/0000978 A1 | * | 1/2003 | Aki | B60R 9/045 224/319 |
| 2003/0071097 A1 | | 4/2003 | Dean | |
| 2003/0146257 A1 | * | 8/2003 | Dean | B60R 9/048 224/319 |
| 2005/0077335 A1 | | 4/2005 | Bourne | |
| 2005/0145639 A1 | | 7/2005 | Viklund et al. | |
| 2006/0000859 A1 | | 1/2006 | Frischer | |
| 2006/0249466 A1 | * | 11/2006 | Wang | B62H 3/02 211/17 |
| 2006/0273122 A1 | | 12/2006 | Bogoslofski et al. | |
| 2006/0273124 A1 | | 12/2006 | Bogoslofski | |
| 2006/0289577 A1 | * | 12/2006 | Malone | B60R 9/058 224/323 |
| 2007/0119888 A1 | | 5/2007 | Chuang | |
| 2007/0164065 A1 | | 7/2007 | Davis | |
| 2008/0000940 A1 | | 1/2008 | Wang | |
| 2008/0029563 A1 | * | 2/2008 | Malone | B60R 9/00 224/319 |
| 2008/0121671 A1 | * | 5/2008 | Cronce | B60R 9/058 224/331 |
| 2008/0164292 A1 | | 7/2008 | Farney | |
| 2008/0193265 A1 | | 8/2008 | Sautter et al. | |
| 2009/0120982 A1 | | 5/2009 | Sautter et al. | |
| 2010/0078454 A1 | * | 4/2010 | Sautter | B60R 9/048 224/315 |
| 2010/0147914 A1 | * | 6/2010 | Sautter | B60R 9/045 224/325 |
| 2011/0084102 A1 | * | 4/2011 | Sautter | B60R 9/055 224/316 |
| 2011/0132946 A1 | * | 6/2011 | Sautter | B60R 9/045 224/324 |
| 2011/0139838 A1 | * | 6/2011 | Sautter | B60R 9/048 224/321 |
| 2011/0139840 A1 | * | 6/2011 | Kraeuter | B60R 9/048 224/324 |
| 2011/0139841 A1 | * | 6/2011 | Sautter | B60R 9/045 224/324 |
| 2011/0139842 A1 | * | 6/2011 | Sautter | B60R 9/045 224/324 |
| 2012/0111910 A1 | * | 5/2012 | Sautter | B60R 9/055 224/309 |
| 2012/0228349 A1 | * | 9/2012 | Sautter | B60R 9/055 224/328 |
| 2012/0234881 A1 | | 9/2012 | Sautter et al. | |
| 2013/0175308 A1 | | 7/2013 | Sautter et al. | |

FOREIGN PATENT DOCUMENTS

| | | |
|---|---|---|
| CN | 201677818 U | 12/2010 |
| DE | 2940095 A1 | 4/1981 |
| DE | 3912692 A1 | 11/1989 |
| DE | 4229268 A1 | 3/1994 |
| DE | 20309766 U1 | 10/2003 |
| EP | 0019873 B1 | 10/1982 |
| EP | 0482650 A1 | 4/1992 |
| EP | 0511179 A1 | 10/1992 |
| EP | 0894672 A1 | 2/1999 |
| EP | 1442940 A1 | 8/2004 |
| EP | 2443006 B1 | 8/2014 |
| FR | 1400231 A | 4/1965 |
| FR | 2481209 A1 | 10/1981 |
| FR | 2501601 A1 | 9/1982 |
| FR | 2519305 A1 | 7/1983 |
| FR | 2600953 A1 | 1/1988 |
| FR | 2624808 A2 | 6/1989 |
| GB | 886743 A | 1/1962 |
| GB | 2257463 A | 1/1993 |
| JP | 2000318538 A | 11/2000 |
| WO | 9624509 A1 | 8/1996 |
| WO | 9810959 A1 | 3/1998 |
| WO | 2005021332 A1 | 3/2005 |
| WO | 2009158360 A1 | 12/2009 |
| WO | 2010141944 A1 | 12/2010 |

(56) References Cited

FOREIGN PATENT DOCUMENTS

| | | |
|---|---|---|
| WO | 2010144369 A1 | 12/2010 |
| WO | 2010148011 A1 | 12/2010 |

OTHER PUBLICATIONS

The International Bureau of WIPO, International Preliminary Report on Patentability regarding PCT Patent Application No. PCT/US2010/038704, dated Dec. 16, 2011, 9 pages.

Australian Patent Office, Examination Report regarding Australian Patent Application No. 2010260146, dated Oct. 2, 2012, 3 pages.

U.S. Patent and Trademark Office, Office action regarding U.S. Appl. No. 12/816,121, dated Nov. 2, 2012, 13 pages.

European Patent Office, Office action regarding European Patent Application No. 10743263.5, dated Dec. 18, 2012, 4 pages.

U.S. Patent and Trademark Office, Office action regarding U.S. Appl. No. 12/816,121, dated Apr. 19, 2013, 11 pages.

European Patent Office, Office action regarding European Patent Application No. 10743263.5, dated May 27, 2013, 4 pages.

U.S. Patent and Trademark Office, Office action regarding U.S. Appl. No. 14/030,050, dated Apr. 3, 2014, 6 pages.

U.S. Patent and Trademark Office, Office action regarding U.S. Appl. No. 14/451,348, dated Dec. 15, 2014, 13 pages.

U.S. Patent and Trademark Office, Office action regarding U.S. Appl. No. 14/451,348, dated Jul. 27, 2015, 33 pages.

ORS Racks direct.com, "Yakima FrontLoader Bike Rack Review Video by ORS Racks Direct", May 19, 2010, Retrieved from the Internet on Oct. 11, 2012, URL:http://www.youtube.com/watch?v=cu8rHM9ORdw, 9 pages.

Rack Attack Portland's Blog, "Another hit from Yakima! The all new factory-compatible FrontLoader upright bike rack", Mar. 29, 2010, Retrieved from the Internet on Oct. 11, 2012, URL:http://rackattackportland.wordpress.com/2010103/29/anotherhit-from-yakima-the-all-new-factory-compatible-frontloader-upright-bike-rack/, 3 pages.

"Yakima FrontLoader upright bike rack review", Apr. 17, 2010, Retrieved from the Internet http://carracks.blogspot.nl/2010/04/yakima-frontloader-upright-bike-rack.html, 2 pages.

Heinlen, Jerry, "Yakima FrontLoader Recall Information", Retrieved from the Internet on Oct. 11, 2012, URL:http://firecall.yakima.com, 2 pages.

Yakima, "FrontLoader", Retrieved from the Internet on Oct. 11, 2012, URL:http://yakima.com/shop/bike/roof/frontloader#pr-header-8002103, 5 pages.

\* cited by examiner

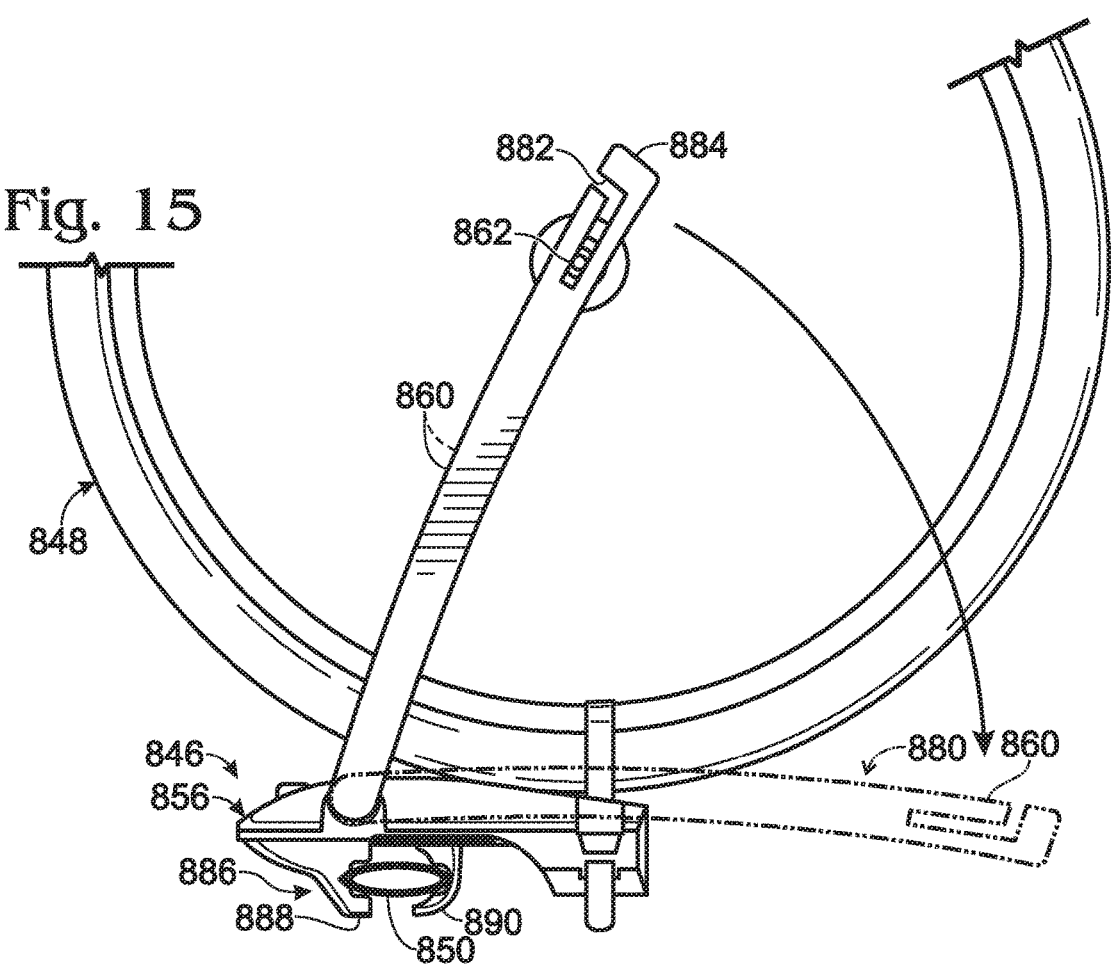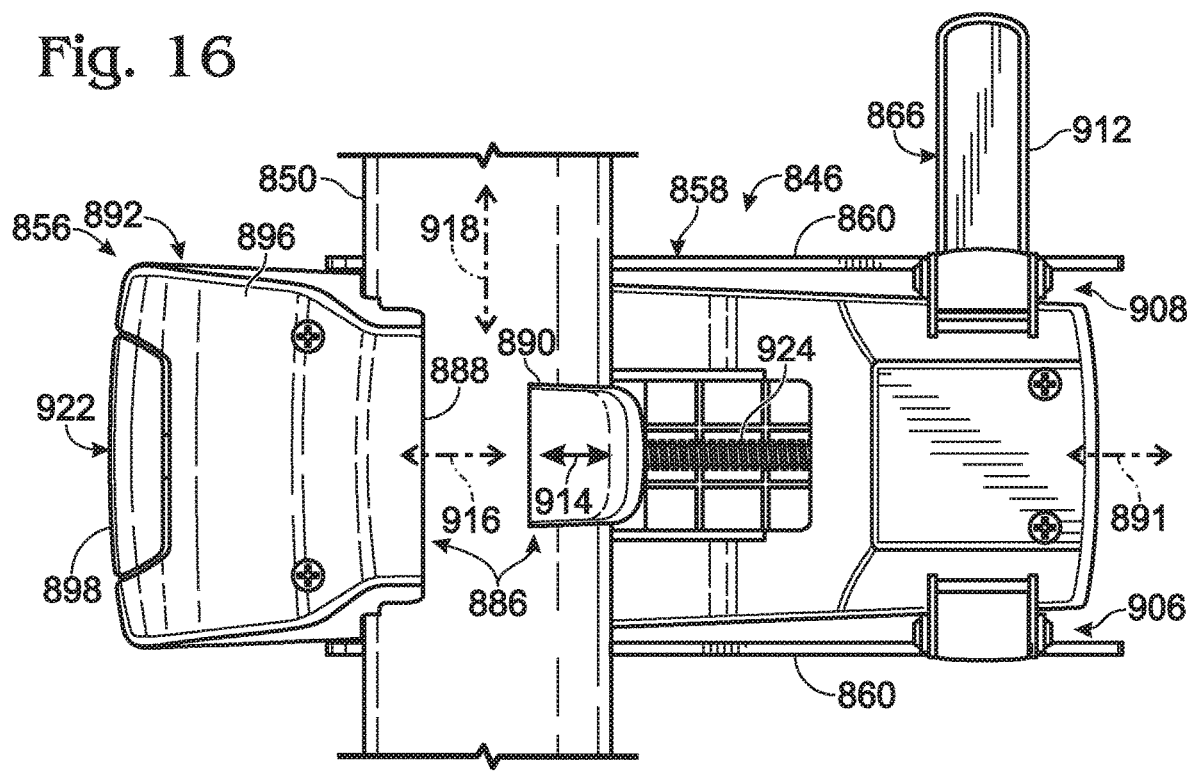

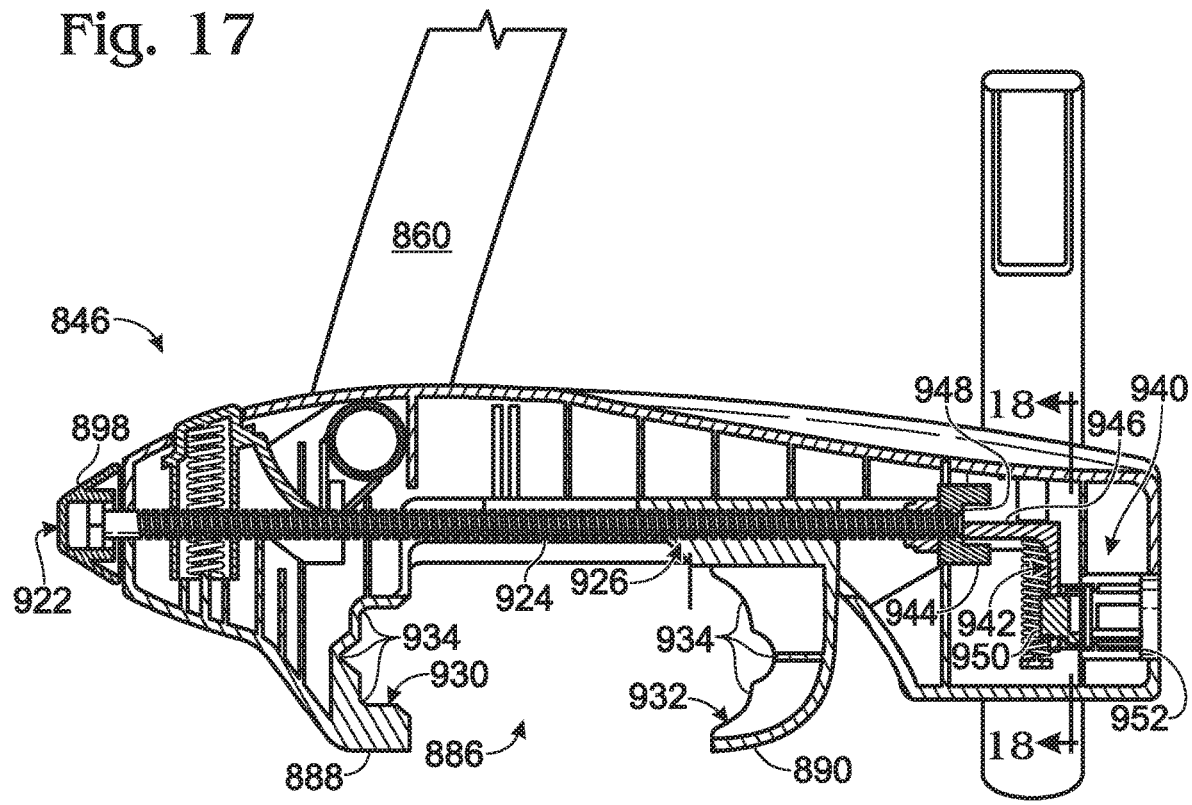

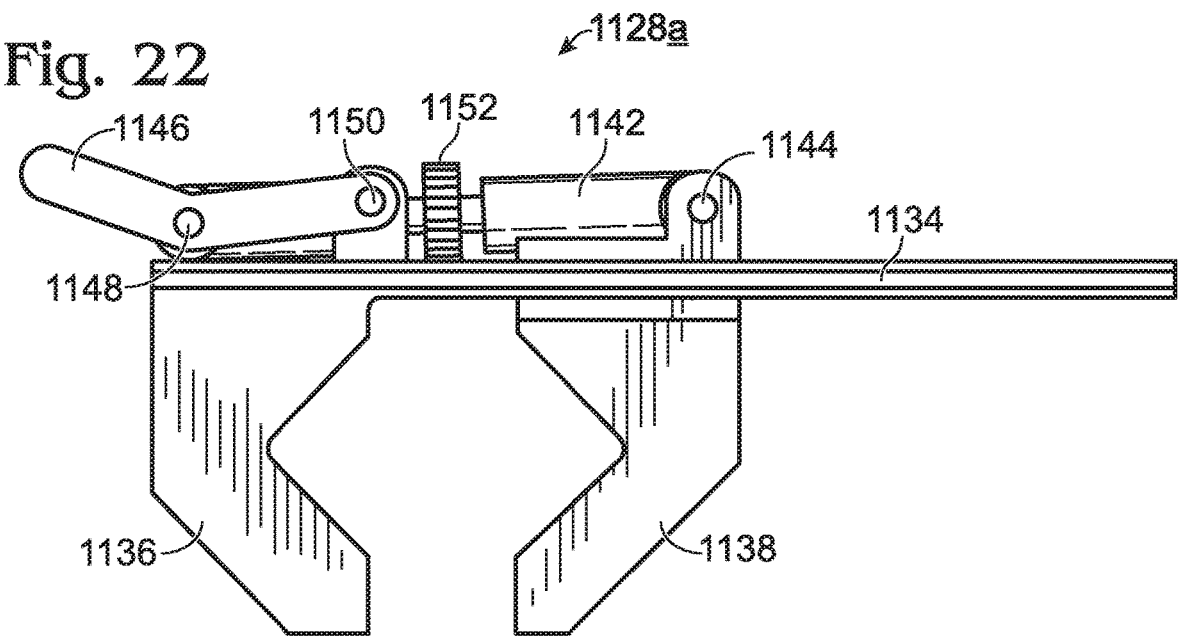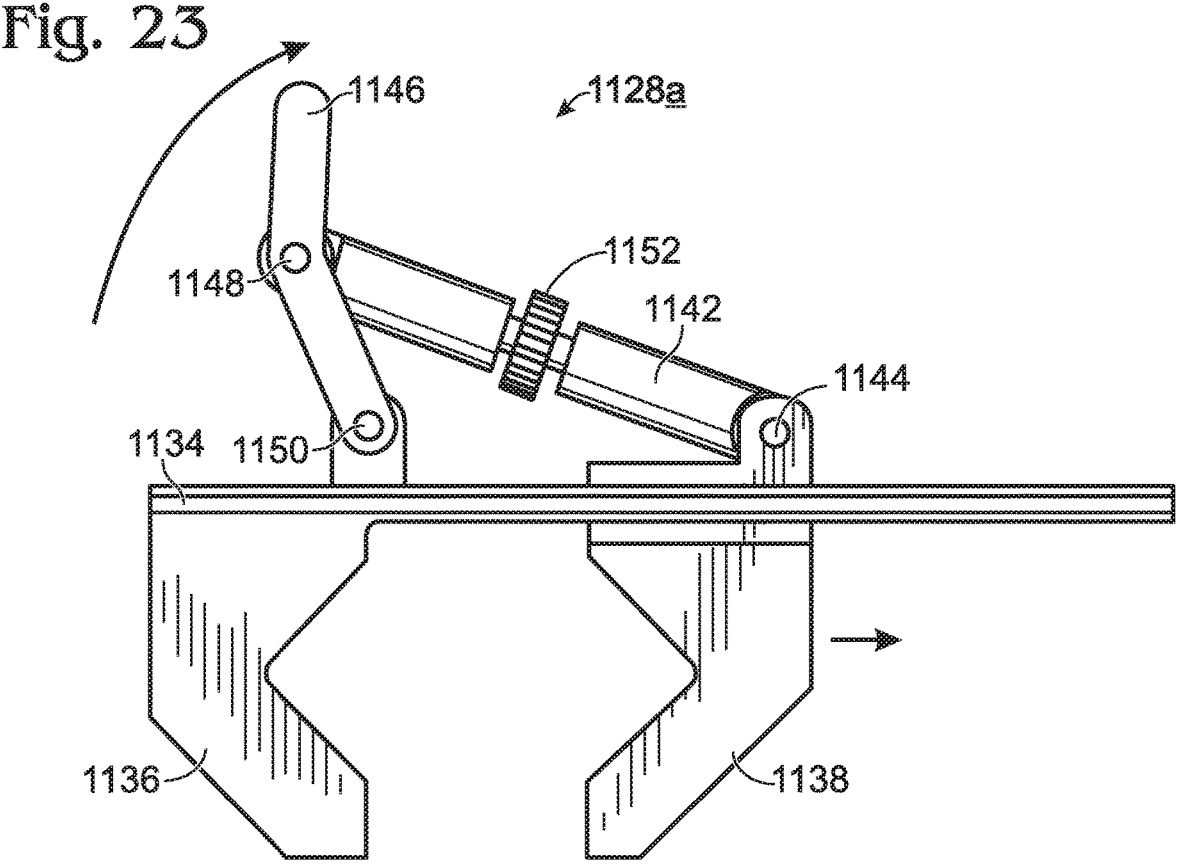

US 10,583,784 B2

CROSSBAR CLAMP DEVICES

CROSS-REFERENCE TO RELATED APPLICATION

This application is a continuation application of U.S. patent application Ser. No. 15/201,387 filed Jul. 2, 2016 which is a continuation application of U.S. patent application Ser. No. 14/451,348 filed Aug. 4, 2014 which is a continuation application of U.S. patent application Ser. No. 14/030,050 filed Sep. 18, 2013 which is a continuation application of U.S. patent application Ser. No. 12/816,121 filed Jun. 15, 2010 which claims priority from U.S. Provisional Patent Application Ser. No. 61/187,197, filed Jun. 15, 2009, all of which are incorporated herein by reference in their entirety for all purposes. This application incorporates by reference in their entireties the following U.S. Pat. Nos. 7,416,098 and 8,210,407.

BACKGROUND

Vehicles commonly use a pair of crossbars mounted on the roof of the vehicle for mounting various rack assemblies for carrying cargo. Crossbars come in many different sizes and shapes. Yakima sells crossbars having a round cross section. Thule sells crossbars having a square cross section. Auto factory installed crossbars often have more irregular, oblong, elliptical, more aerodynamic shapes.

The diversity in crossbar shapes and sizes has caused a challenge for rack manufacturers to make racks that are adaptable for installation on a wide range of crossbar shapes. Typically, a rack company has to offer a large number of adapters for connecting its racks to different crossbar shapes.

SUMMARY

An apparatus for carrying cargo on top of a vehicle includes a pair of crossbars, each crossbar being secured to the vehicle by a pair of towers. A clamp assembly is configured to secure a particular cargo item, for example, bike, boat, skis, snowboard, cargo box, among other things, to the crossbars. A clamp assembly includes jaw members, at least one of which is movable relative to the other jaw member, along a horizontal path substantially perpendicular to a crossbar. Each jaw member may have an internal surface which is concave and configured for gripping crossbars of different shapes and dimensions.

BRIEF DESCRIPTION OF THE DRAWINGS

FIG. 15 is a side view of a rack for carrying a bicycle wheel, clamped to a crossbar.

FIG. 16 is a bottom view of the clamp shown in FIG. 15.

FIG. 17 is a cross-sectional side view of the clamp shown in FIGS. 15 and 16.

FIGS. 22-24 are side views of the clamp shown in FIG. 21, illustrating movement of an actuator for controlling relative movement of the clamp between clamped and unclamped positions.

DETAILED DESCRIPTION

Figure 1:
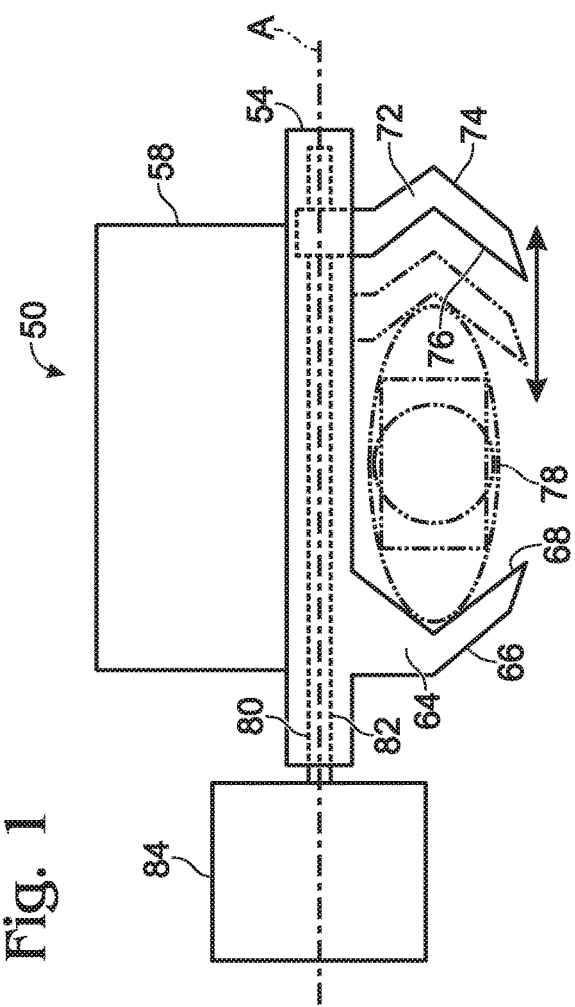
FIG. 1 is a schematic side view of a clamp for securing cargo to a crossbar.

FIG. 1 shows rack 50 for carrying cargo on top of a vehicle. Rack 50 includes base 54. Cargo-specific securing device 58 is connected to a top side of base 54. Stationary jaw or claw member 64 forms a wall descending from a bottom side of base 54. Jaw 64 has an external surface 66 and an internal concave surface 68. Sliding jaw or claw member 72 is movable either toward or away from stationary jaw 64. Sliding jaw 72 has an external surface 74 and a concave inner surface 76 for cooperatively gripping crossbar 78 along with stationary jaw 64. Shaft 80 is connected to sliding jaw 72, and has handle 84 for manipulating shaft 80 resulting in horizontal movement of sliding jaw 72 along axis A.

As shown in FIG. 1, sliding jaw 72 is capable of a reciprocating, back and forth motion in a direction which may be referred to as "horizontal". In this case, a horizontal direction basically means it is perpendicular to a gravitational direction which is considered "vertical". Both of the "horizontal" and "vertical" directions are considered to be linear directions in contrast to curved, or angular directions.

Cargo securing device 58 may be adapted, for example, to secure a bike, a boat, skis, snowboards, or any other kind of cargo being transported with a vehicle. Cargo securing device 58 may take the form of a cargo box which may include a hard shell or a soft shell, i.e., a cargo bag.

Shaft 80 may have threads corresponding to internal threads in sliding jaw 72 for actuating horizontal movement of sliding jaw 72 in response to rotation of shaft 80. Alternatively, shaft 80 may be attached to sliding jaw 72 at a fixed point, while permitting rotation of shaft 80. Shaft 80 may be threaded near proximal end 82 of shaft 80. In this case, shaft 82 would have threads complementing internal threads in base 54 so that shaft 80 moves along axis A in response to rotation of shaft 80, thus causing corresponding horizontal movement of sliding jaw 72.

Handle 84 may take the form of a screw-type handle for permitting rotation of shaft 80. Alternatively, handle 84 may take the form of a pivoting cam lever. A cam lever may have a pivot axis perpendicular to axis A, and an eccentric surface which causes shaft 80 to move horizontally when the cam lever is pivoted from a first position to a second position. A cam lever may also use a threaded screw relationship, either to sliding jaw 72 or to base 54, for gross adjustment, with pivoting motion of the cam lever for final clamping actuation.

Figure 2:
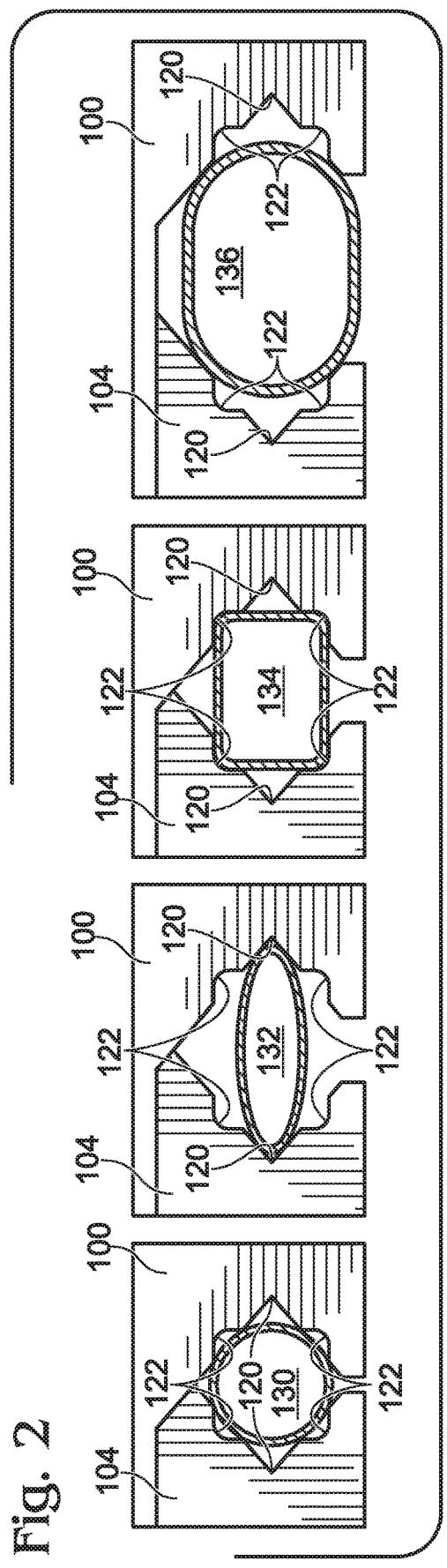
FIG. 2 is a series of partial side views of a clamp gripping crossbars of different shapes and sizes.

FIG. 2 shows how jaw portions 100, 104 adapt to grip crossbars of different shapes. For this purpose, angled notches 120 and curved notches 122, may be provided on the internal surfaces of jaws 100 and 104. The first view shows jaws 100 and 104 clamped on circular crossbar 130. In the second view, jaws 100 and 104 are clamped on oval- or elliptically-shaped crossbar 132. The tips of the elliptical shape are received in angled notches 122. The third view shows jaws 100 and 104 clamped on a rectangularly-shaped crossbar 134. The corners of the crossbar shape are received in curved notches 122. The fourth view shows jaws 100 and 104 clamped on oval crossbar 136. In both the first and the fourth view, i.e., circular and oval crossbar shapes, the bar contacts shoulder-like projections on the inside of the jaws between or around the notches.

Figure 3:
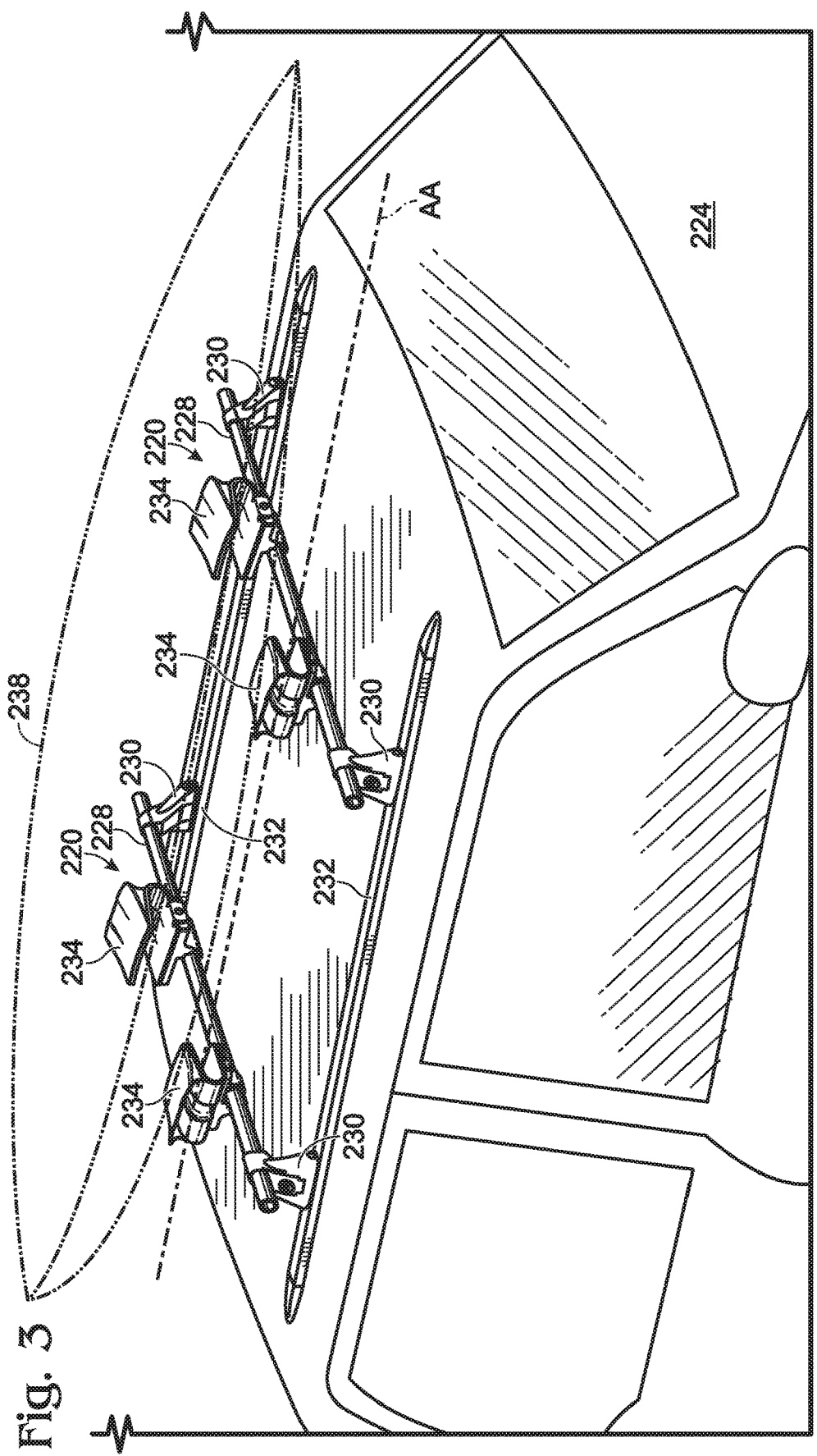
FIG. 3 is a perspective elevation view of a rack for carrying a boat on top of a vehicle.

FIG. 3 shows rack 220 mounted on top of vehicle 224. Rack 220 includes crossbars 228 mounted on vehicle 224 via towers 230. Each tower 230 secures one end portion of crossbar 228 to rail 232 provided on top of vehicle 224. Each crossbar 228 supports a pair of saddle mounts 234 for supporting the hull of boat 238. As shown in FIG. 3, axis AA defines an elongate axis parallel to the direction of travel for vehicle 224. Axis AA is perpendicular to crossbars 228. Axis AA is equidistant from each of saddle mounts 234. Axis AA may be referred to as a cradle axis.

Figure 4:
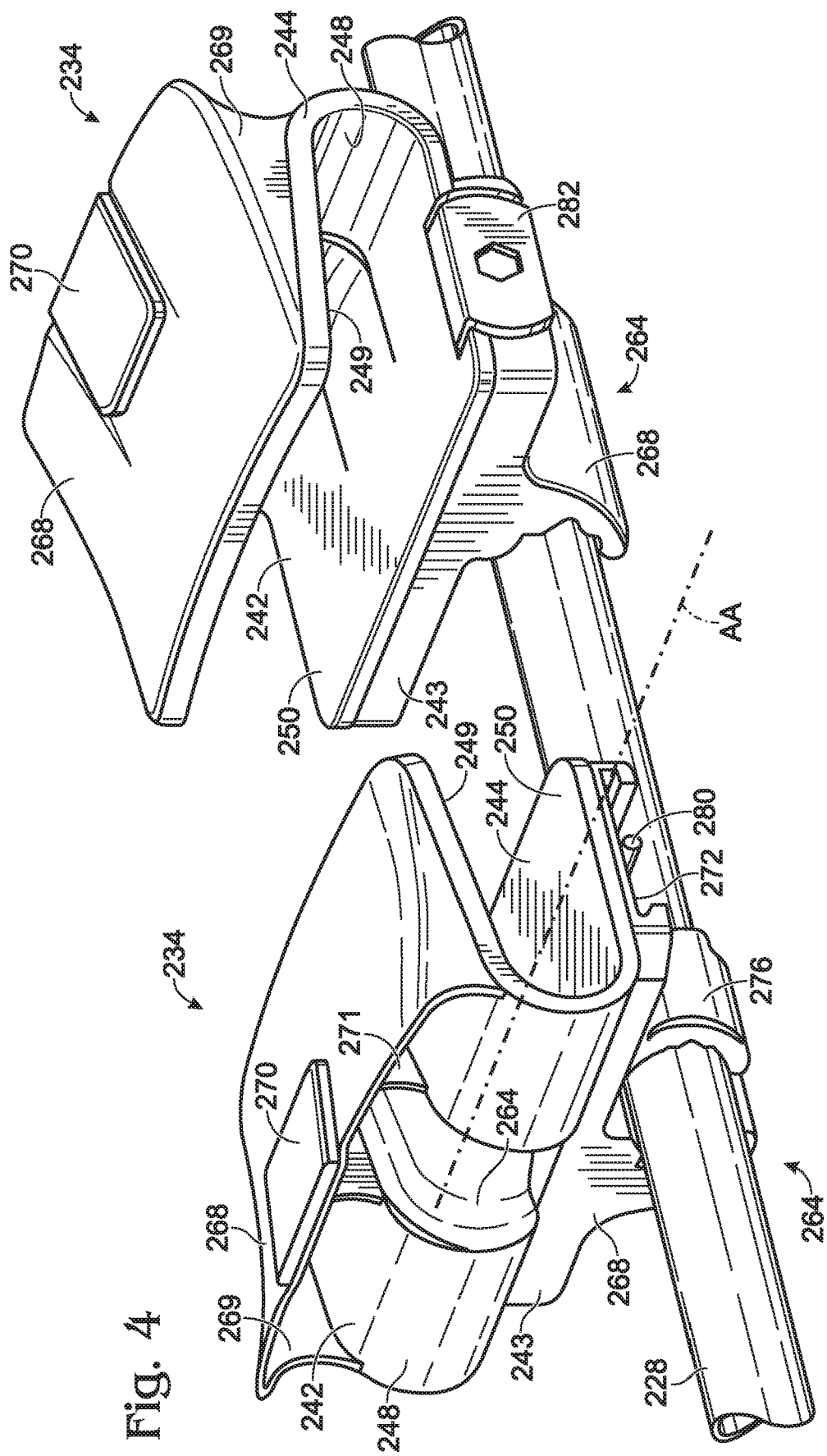
FIG. 4 is a close up, perspective elevation view of a pair of saddle mounts clamped to a crossbar.

FIG. 4 shows a pair of saddle mounts 234 mounted on crossbar 228 equidistant from axis AA. Each of saddle mounts 234 are, preferably, constructed substantially identically to provide simplicity and efficiency in manufacturing and assembly. Saddle mounts 234 may be mounted facing each other simply by orienting the clamp handles on opposite sides of the crossbar, as shown.

As shown in FIG. 4, each saddle mount 234 includes a single piece C-shaped portion or support member 242 mounted on base 243. In a preferred example, C-shaped portion 242 has a thickness in a range of approximately 0.025-inches to 0.225-inches, or more specifically, 0.125-inches. C-shaped portion 242 also may have side walls 244 which are somewhat thicker, for example, 0.25-inches. C-shaped portion 242 includes curved middle region 248 which may have a diameter in the range of 0.5-inches to 2.5-inches, or more specifically, for example, 1.3-inches. Curved middle region 248 connects upper platform portion 249 to floor expanse 250 of C-shaped portion 242. Floor expanse 250 is secured to base 243.

C-shaped portion 242 may have one or more stiffening ribs or dents 264 for strengthening saddle mount 234 and/or resisting various forces applied by a boat hull. Wing expanse 268 is connected to the top side of upper platform portion 249 of C-shaped portion 242. Wing expanse 268 has side walls 269 forming a three-sided, open-ended, diaphragm for gripping, adapting, conforming, cushioning, and/or supporting the hull of a boat. Wing expanse 268 has a recessed area on the top surface which holds frictional pad 270, for example, made of rubber, for frictionally gripping the outer surface of a boat hull. In a preferred embodiment, the elastomeric pad 270 is made of Dynaflex G2709 which has a 53 shore A durometer specification. Wing expanse 268 also may have internal stiffening ribs 271 connecting wing expanse 268 to upper platform portion 249.

In a preferred embodiment, C-shaped portion 242 is made of plastic comprising unfilled Nylon 6/6 which allows the mount to flex without cracking. The C channel or gap may collapse so that the tips of the C are touching for a steeped-bottom boat (approximately 20 degrees of flex). In contrast, the C structure may also open up for a flat-bottom boat (approximately 9 degrees of flex). Youngs Modulus is about 160,000 PSI. The yield strength of the material is approximately 6000 PSI. Base 243 is preferably made of glass-filled nylon for stiffness and structure.

Figure 9:
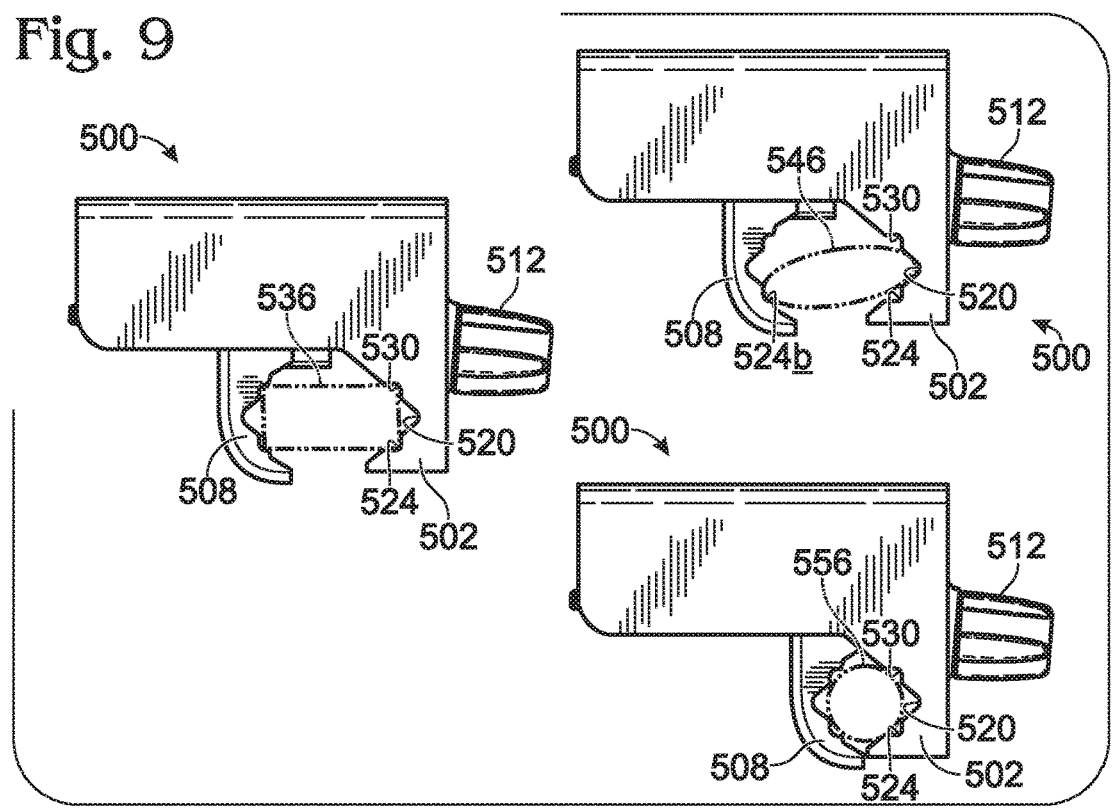
FIG. 9 is a series of partial side views of a clamp gripping crossbars of different shapes and sizes.

Each saddle mount 234 includes clamps 264 for securing C-shaped portion 242 to crossbar 228. Base 243 includes stationary or fixed jaw 268 descending downward from a side of base 243 opposite from the top side to which C-shaped portion 242 is attached. Base 243 has internal track 272 for retaining and guiding sliding jaw member 276. Threaded bolt or screw shaft 280 engages sliding jaw member 276. Rotation of bolt 280 causes sliding jaw member 276 to move, alternately, back and forth, toward and away, from stationary jaw 268, along a path parallel to axis AA, and perpendicular to crossbar 228. Handle 282 is attached to bolt 280 for manually turning bolt 280. Handle 282 may be a knob or other device configured for twisting or rotating to cause rotation of shaft 280 resulting in translation of sliding jaw member 276. Alternatively, handle 282 may be replaced by a cam lever configured to screw and/or pivot causing movement of sliding jaw member 276 (FIG. 9).

Figure 5:
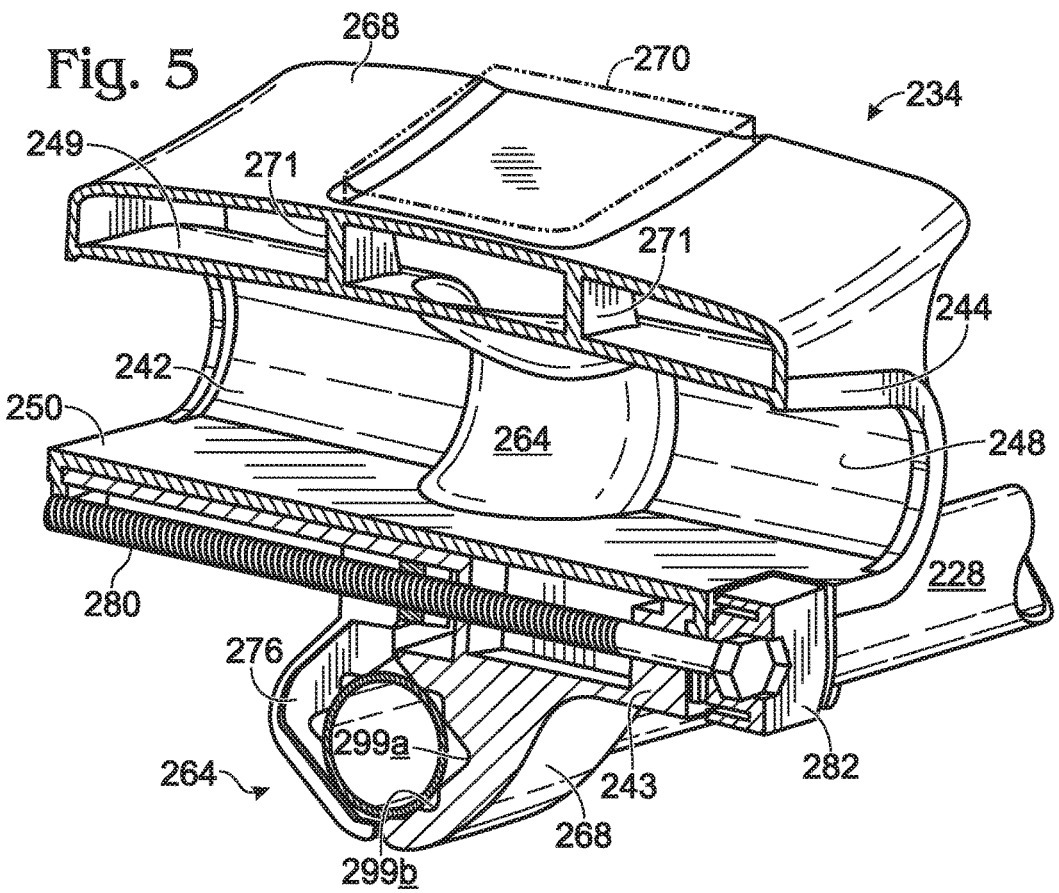
FIG. 5 is a cross-sectional view through one of the saddle mounts shown in FIG. 4.

FIG. 5 shows a cross-sectional view of saddle mount 234 mounted on crossbar 228. Clamp 264 includes stationary jaw 268 and sliding jaw 276 for cooperatively clamping crossbar 228. Each of the jaws, as shown, have internal notches or grooves 299a, 299b for adapting to crossbars of different shapes, as explained in more detail below. Stationary jaw portion 268 is integrally formed with or from base 243. Bolt 280 extends through base 243, and is engaged with a threaded aperture in sliding jaw member 276. Handle 282 is provided for rotating bolt 280, thereby causing sliding jaw member 276 to move alternately, toward and away from stationary jaw portion 268. As explained above, a different type of actuator handle, for example, a pivoting cam lever may also be used. Floor expanse 250 of C-shaped support 242 is fastened to base 243. Floor expanse 250 is connected to curved middle region 248, which in turn is connected to upper platform portion 244. Upper platform portion 244 is cantilevered inward toward axis AA (cradle axis) and the other saddle mount, as shown in FIG. 2. Wing expanse 268 has side walls 270 creating a three-sided open-ended diaphragm for interfacing with a boat hull.

Figure 6:
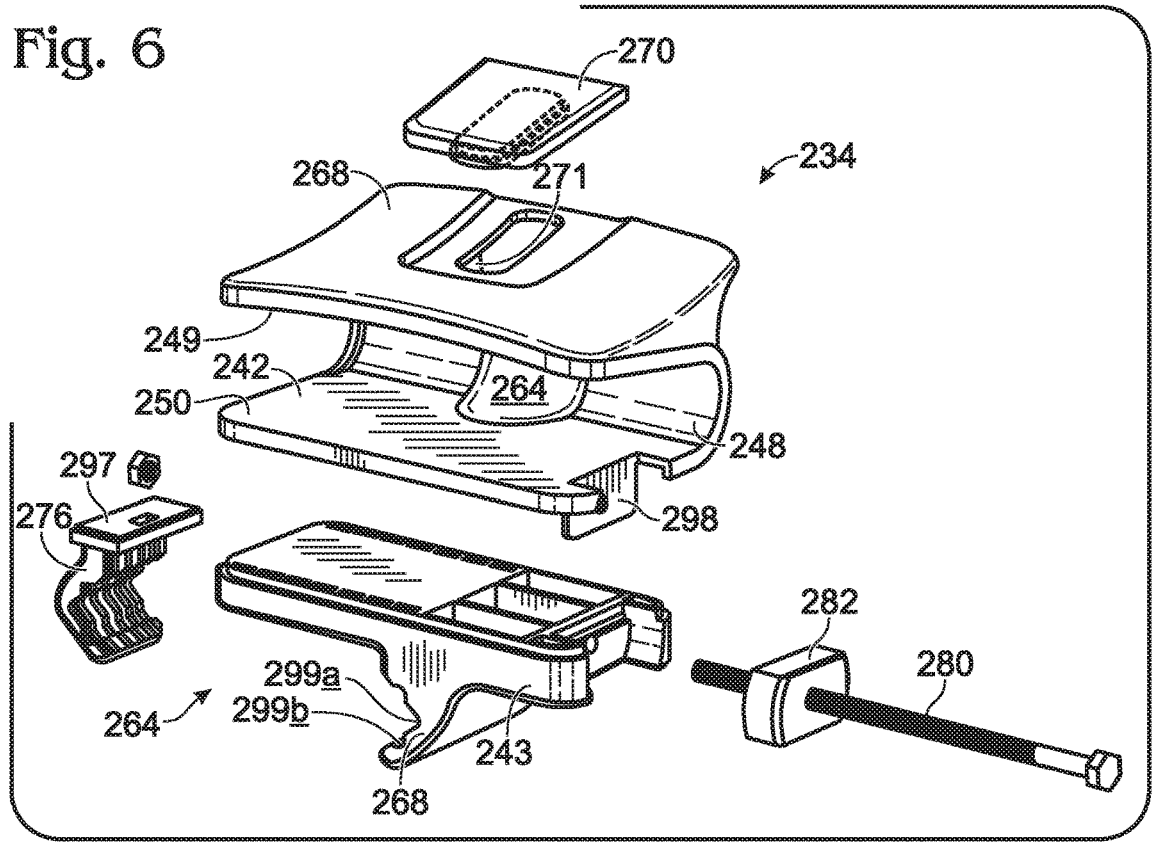
FIG. 6 is an exploded view of one of the saddle mounts shown in FIG. 4.

FIG. 6 shows an exploded view of saddle mount 234 with most of the structures numbered the same as in FIGS. 4 and 5. Clamp 264 includes base 243 and stationary jaw portion 268. Sliding jaw member 276 has upper plate portion 297 which slides in internal track 272 (see FIG. 4) of base 243. Bolt 280 and handle 282 are operable for controlling sliding movement of jaw member 276. C-shaped support 242 includes flange 298. Flange 298 has a hole for receiving bolt 280 and securing floor expanse 250 onto base 243. Other structure shown in FIG. 6 are the same as already described above.

Figure 7:
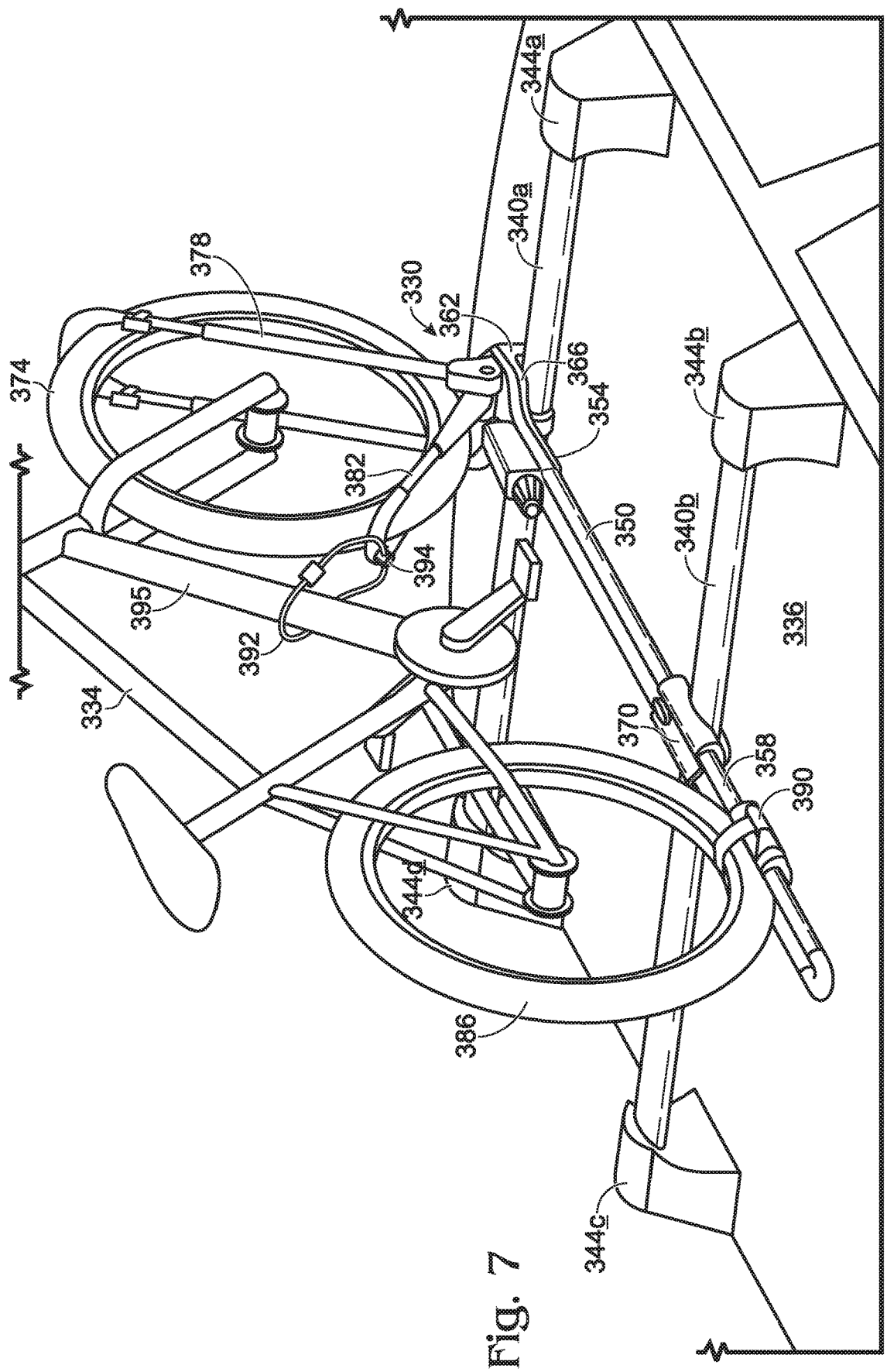
FIG. 7 is a perspective elevation view of a bike mount clamped to a pair of crossbars.

FIG. 7 shows bike mount 330 for carrying bicycle 334 on top of vehicle 336. Crossbars 340a and 340b are secured to the roof of vehicle 336 via towers 344a-d. Bike mount 330 includes elongate base 350 having front portion 354 and back or rear portion 358. Front portion 354 of base 350 includes head portion 362. Head portion 362 has clamp 366 for gripping front crossbar 340a. Rear portion 358 of body 350 has rear clamp 370 for gripping rear crossbar 340b. Front wheel 374 of bike 334 is gripped by first hoop 378 and second hoop 382. Rear wheel 386 of bicycle 334 is gripped by rear wheel binding 390. Cable lock 392 passes through ring 394 on second hoop 382 and around downtube 395 of bicycle 334 for preventing theft.

Figure 8:
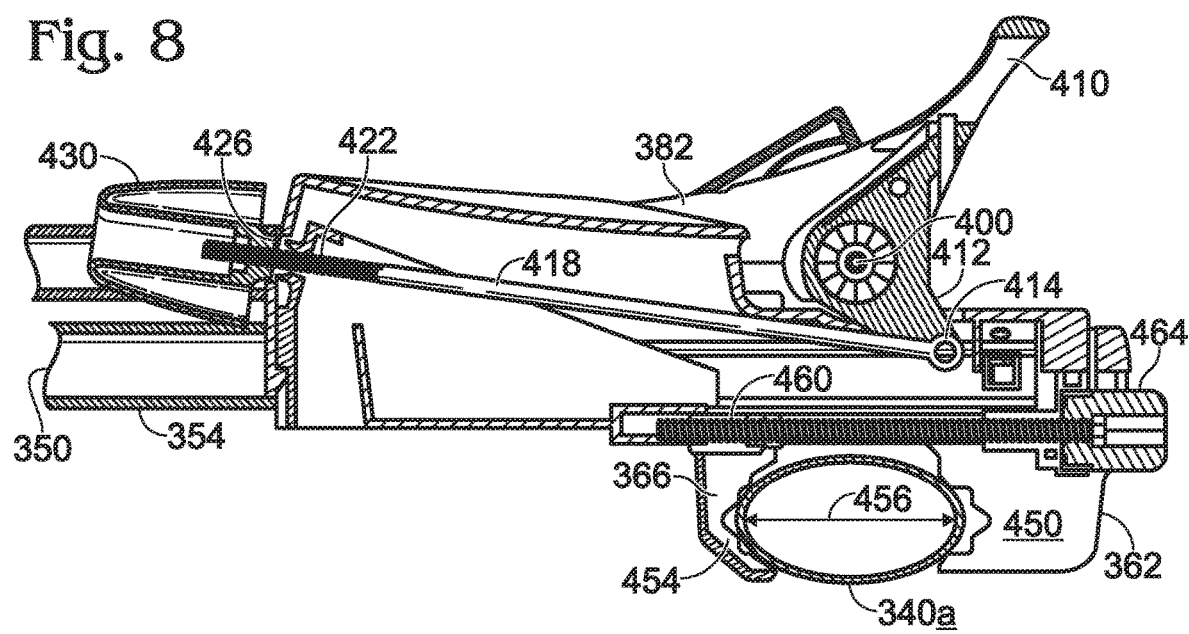
FIG. 8 is a cross-sectional side view of the front portion of the bike mount shown in FIG. 7.

FIG. 8 shows a cross-section through head 362 of elongate body 350 of bicycle mount 330. Second hoop member 382 has ramp 410 for engaging or contacting a front wheel of a bicycle as it is loaded onto rack 330. As a wheel rolls onto ramp 410, second hoop member 382 pivots upward around axis 400 to an upright or clamping position.

Second hoop member 382 also has lever arm 412 projecting downward when second hoop member 382 is in its collapsed or stowed position. Lever arm 412 has pivot point 414. Bolt member or shaft 418 is connected to pivot point 414 of lever arm 412. The opposite end portion of 422 of bolt member 418 is threaded, and projects through opening 426 of head 362. Knob or handle 430 has a hole with internal threads for engaging threaded end portion 422 of bolt member 418. Tightening rotation of handle 430 causes lever arm 412 to rotate around axis 400 in a clockwise direction, as shown in FIG. 3. Second hoop member 382 including ramp 410 and lever arm 412 may also be referred to as a three-way rocker system for clamping a bicycle wheel. In use, it can be seen that a wheel exerting a forward force on ramp 410 causes clockwise rotational movement of lever arm 412, and corresponding movement of bolt member 418 through opening 426, thus exposing visibly threads on bolt member 418. A user may then simply spin or rotate handle 430 in a clockwise, or tightening direction until the threads are no longer visible and the second hoop member is tightened in a carriage position around a front bicycle wheel.

In operation, when the front wheel of a bike hits the ramp at the front of the rear hoop, the weight of the bike pushes the ramp down and the rear hoop rotates up against the wheel. When the rear hoop raises up, the long bolt is driven towards the rear of the bike. The knob or handle (preferably red) is attached to the long bolt and also moves rearward, exposing about two inches of threads of the long bolt between the base and the red knob. The weight of the bike keeps the front wheel in position and the front wheel rotated up which allows the user to let go of the bike. The user spins the red knob until it is seated against the base then tightens the knob. With the knob tight against the base, the long bolt is prevented from moving forward and allowing the rear hoop to rotate down and release the bike.

To release the bike, the red knob is loosened until it hits a stop formed by a locking nut at the end of a long bolt. With the knob fully loose, a gap is formed between the knob and the base exposing the long bolt. The bike is then rolled rearward which allows the rear hoop to lower and the knob to move forward to the base. When the bike is released and removed, the front hoop is folded down toward the back of the mount.

FIG. 8 also illustrates components of front clamp 366 of head 362. Head 362 includes stationary jaw 450 descending from the bottom side of head 362. Sliding jaw 454 is movable, in a reciprocating mode, back and forth in an internal track of head 362, alternately toward and away from stationary jaw 450 in the direction of arrow 456. Threaded bolt 460 extends through head 362, and engages a threaded aperture in sliding jaw 366. Handle 464 is connected to the other end of bolt 160. Rotation of handle 464 causes reciprocating motion of sliding jaw 366 in the back and forth directions of arrow 456. Handle 464 may take the form of a simple screw knob, or may use a pivoting cam lever to actuate movement of the sliding jaw. It may also be useful to use a screwing and pivoting cam lever, the screwing action for rough adjustment, and the pivoting cam action for final quick engagement and release.

As shown in FIG. 8, the jaws 450 and 454 have contours on their inner surface which are configured for accommodating crossbars of different shapes and sizes. For a bike mount that straddles two crossbars, preventing rotation on a single crossbar is less important. However, accommodating different crossbar shapes and angles may be an objective.

FIG. 9 shows a series of views of a bike mount clamp adapting to grip crossbars of different shapes and sizes. For example, head portion 500 includes stationary jaw 502 and sliding jaw 508. Knob 512 is provided for controlling reciprocating back and forth movement of sliding jaw 508 toward and away from stationary jaw 502. Each jaw has an internal surface with grooves, notches, and/or recesses for accommodating different crossbar shapes. Grooves on the inner surface of each jaw include center groove 520, lower groove 524, and upper groove 530. The first view in the series shows grooves 524, and 530 of jaws 502 and 508 gripping a rectangular crossbar 536. The next view (upper right) shows center groove of stationary jaw 502 and lower groove 524b of sliding jaw 508 gripping an angled, elliptically-shaped crossbar 546. The third view (lower right) shows stationary jaw 502 and sliding jaw 508 gripping round crossbar 556. Round crossbar 556 contacts the shoulders of the inner surfaces of the jaws between the grooves.

Figure 10:
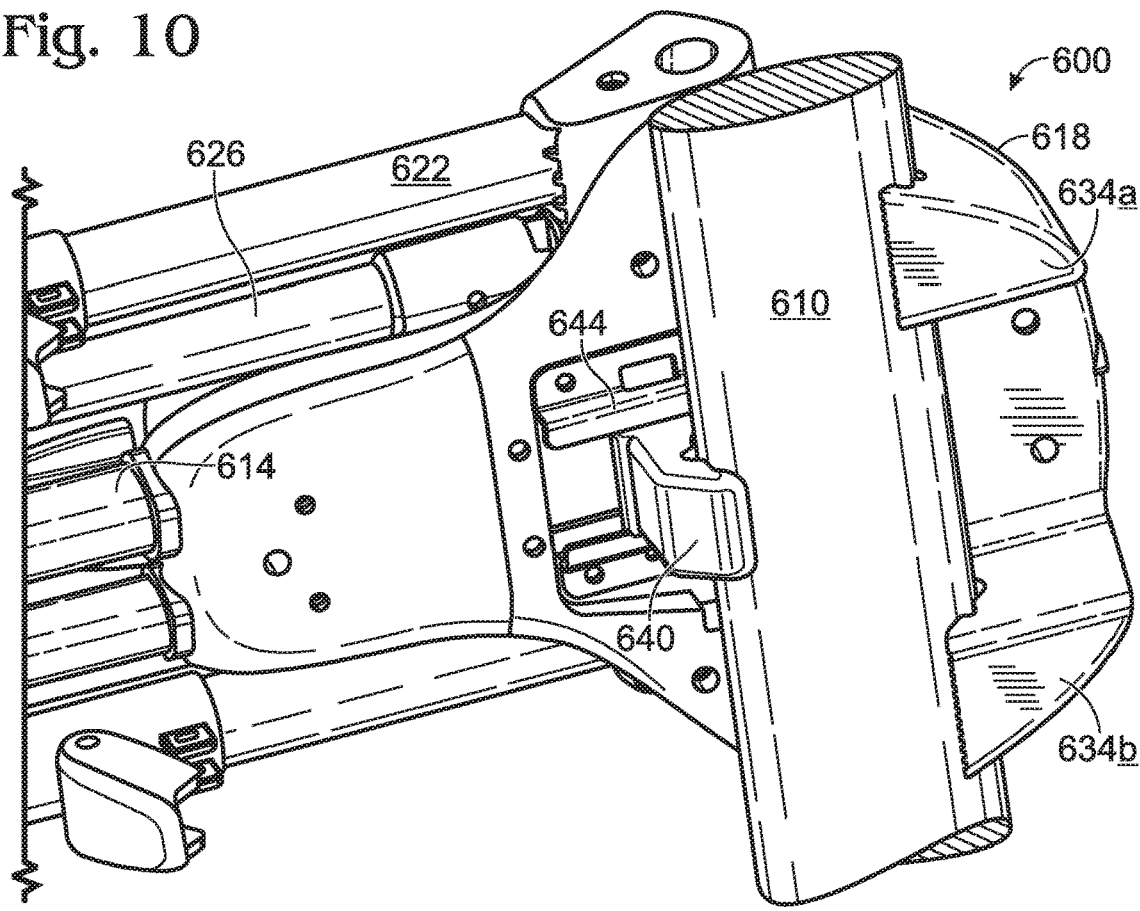
FIG. 10 is a perspective bottom view of a clamp for connecting a bike mount to a crossbar.

FIG. 10 shows a bottom view of bike mount 600 clamped on elliptically-shaped crossbar 610. Elongate base 614 includes head 618. First hoop member 622 and second hoop member 626 are collapsed into their stowed position substantially parallel with elongate body 614. Two stationary jaws 634a and 634b descend from the bottom side of head 618. Sliding jaw 640 moves back and forth in track 644.

Figure 11:
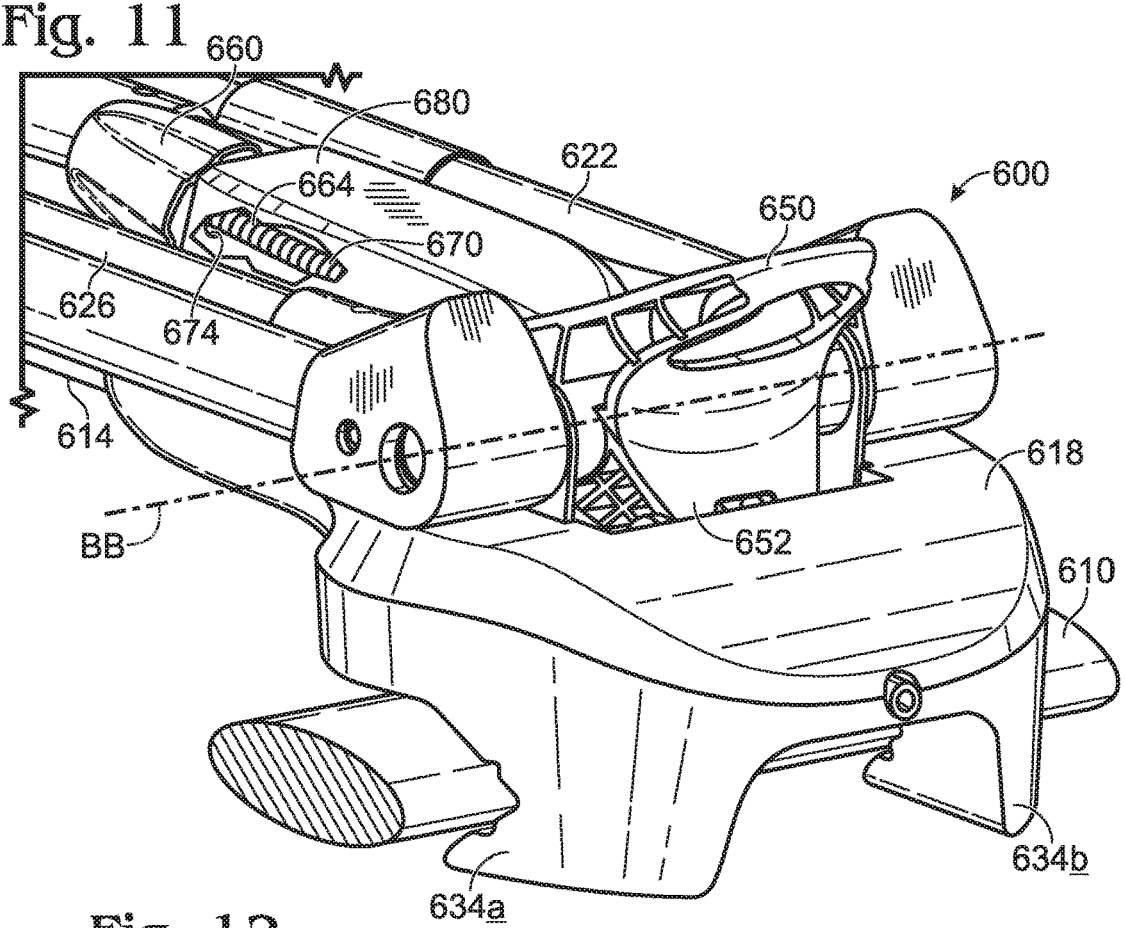
FIGS. 11 and 12 are partial perspective elevation views of a head portion of a bike mount clamped to a crossbar.

FIG. 11 shows a perspective elevation view of the bike mount shown in FIG. 10. Elongate body 614 includes head 618. Stationary jaws 634a and 634b descend from the bottom side of head 618 for clamping elliptically-shaped crossbar 610. First hoop member 622 and second hoop member 626 are collapsed in their stowed position. Ramp 650 projects upward while lever arm 652 projects downward in a position ready for bicycle loading onto the mount. Knob or handle 660 is provided for tightening second hoop member 626 on the back of a front wheel of a bicycle. As explained previously, after a bike rolls onto ramp 650, second hoop member 626 pivots around axis BB upward into contact with the front wheel of the bicycle. This causes handle 360 to move backwards, thereby moving threads 664 of bolt 670 through aperture 674 of housing 680. When threads 664 are viewable from outside of housing 680, the user may simply spin or tighten knob 660 to secure clamping on the front wheel of the bicycle.

Figure 12:
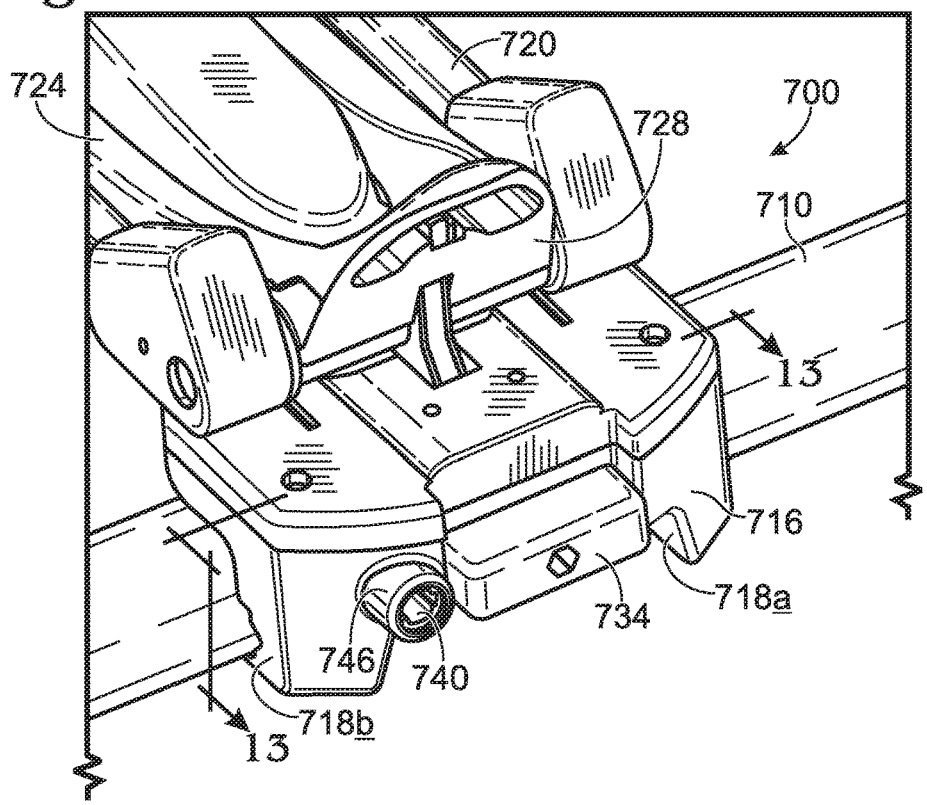

FIG. 12 shows the front portion of bike mount 700 including head 716 having first and second stationary jaws 718a and 718b. First hoop member 720 and second hoop member 724 are shown in their stowed position. Ramp 728 projects upward ready for bicycle loading. Handle 734 is provided for controlling longitudinal sliding movement of a sliding jaw (not shown). It should be appreciated that other tightening mechanisms may be substituted for handle 734. For example, a "quick release" style cam lever type actuator may be used instead. Lock device 740 is provided for locking head 716 onto crossbar 710 as shown and explained in more detail below. A key may be used to rotate a lock cylinder inside port 746 which may selectively obstruct, restrict or block rotation of handle 734.

The sliding jaw or "claw" may be driven by a screw, for example, approximately 5 inches long. At one end of the screw is a knob. To lock the mount to the crossbar, a locking feature may be added to prevent the knob from turning. The locking solution may vary between products. Any solution that prevents the screw from turning may be used to lock the mount to the crossbars.

Figure 13:
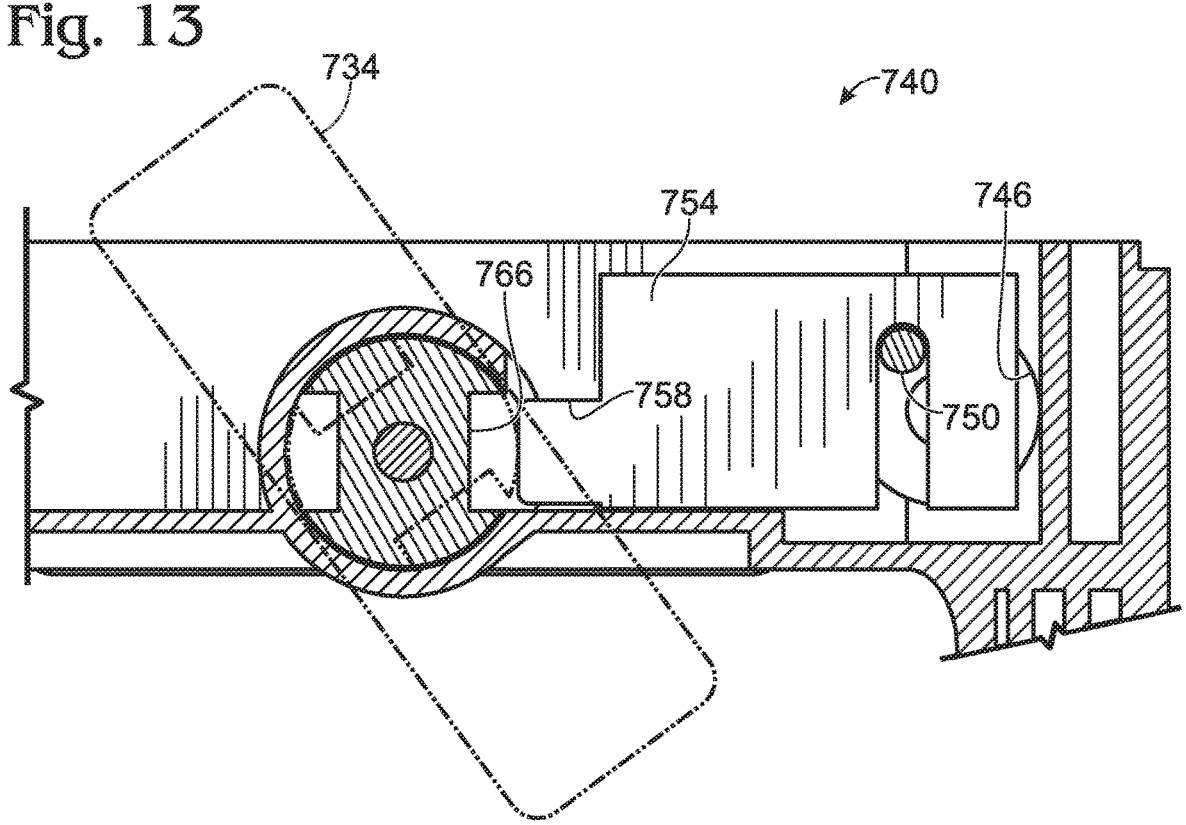
FIGS. 13 and 14 are partial cross-sectional views illustrating a lock device for a crossbar clamp.
Figure 14:
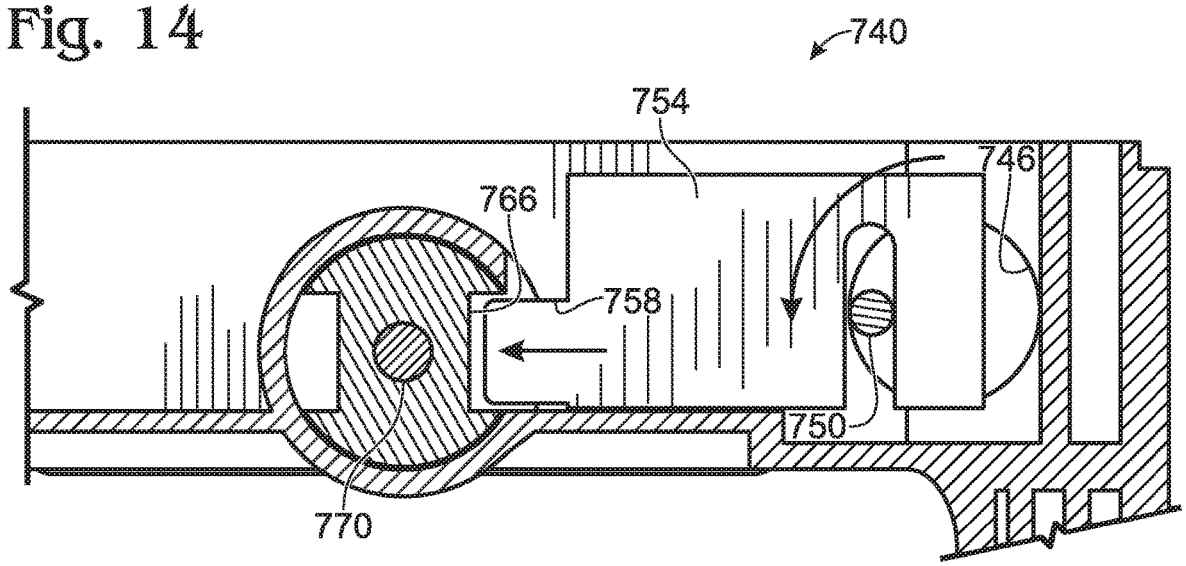

FIGS. 13 and 14 show views inside lock device 740 illustrating an exemplary locking mechanism. Lock device 740 has a key-operated barrel 746. As barrel 746 rotates, pin 750 also rotates counterclockwise as shown from the view in FIG. 8 to the view in FIG. 9. Movement of pin 750 shifts follower 754 to the left of the figures, as shown by the arrow in FIG. 9. Handle 734 is connected to a shaft component which has notches or recesses 756. When follower 754 moves to the left in FIG. 9, projection 758 moves into recess 766, thereby preventing handle 734 from rotating. The position in FIG. 14 prevents shaft 770 from rotating, thereby preventing the bike mount from being removed from the crossbar.

For smaller mounts, for example, such as boat, saddles or a wheelfork, the fixed jaw may be approximately 3-4 inches wide while the sliding jaw may be narrower, for example, 1-2 inches wide. To prevent crossbar damage on a larger mount like an upright bike mount, the load may be spread further apart. The upright bike mount may have a clamp area that is, for example, approximately 8 inches wide. Rather than have two sets of clamps 8 inches apart, the mount may have a pair of fixed jaws with one sliding jaw set between the fixed jaws. With only one center sliding jaw, the mount may be easier to attach to the crossbar.

Each front stationary jaw is about an inch wide. The total span, to the outside, of the two front jaws is at least six inches, or more preferably about seven inches. A wider span is more stable. If the jaw span is smaller, the loads on the crossbar are higher. This may cause small or weaker crossbars to fail. Also a seven inch wide clamp span coincides with a reasonable seven inch span for the width of the front wheel hoop. In a preferred design the space between the front jaws is about 4.75 inches. The gap reduces material, allows the rack to better fit crossbars with a slight crown. Having a gap also allows the mount to straddle or avoid other crossbar mounts, for example, mounting hooks for a fairing.

FIG. 15 shows another example of a horizontal clamp being used for a wheel carrier. Wheel carrier 846 and wheel 848 are shown from the side. Arms 860 may be pivotable, as a unit, with respect to base 856. The arms may have a wheel receiving position, in which the arms extend upwardly from base 856, as shown here. In the wheel receiving position, the arms may extend at any suitable angle with respect to the direction of gravitational force, such as substantially parallel (e.g., within about 20 or 10 degrees from parallel) or oblique to the direction of gravitational force (e.g., about 20 to 60 degrees from parallel). For example, the arms may slant rearward, as shown here. The arms also may have a storage position, indicated in phantom outline at 880, in which the arms extend horizontally.

Each arm may define at least one slot 882. The slot may be formed near a distal end 884 of arm 860, generally with the distance of slot 882 from base 856 being about the same as or greater than a radius of wheel 848. Slot 882 may form a receiver at which axle 862 can be received from an end or a side of arms 860. In the present illustration, the slot has a mouth formed on the side of arm 860. The slot is generally wide enough to receive a segment of wheel axle 862. The slot may or may not be elongate and may extend along arm 60 and partially across the arm. In the present illustration, slot 882 extends both partially across and then along arm 860 on an L-shaped path. The slot may be elongate in a direction along arm 860 to permit wheels of different size (i.e., having distinct radii) to be used with the same wheel carrier. In other words, smaller wheels may have their axles disposed farther down slot 882 toward base 856, while larger wheels may have their axles disposed closer to distal end 884, when the wheel is secured to the carrier. In other embodiments, slot 882 may extend obliquely to the long axis of arm 860.

Base 856 may provide a bar mount or clamp 886. The clamp may opposingly engage bar 850 with a pair of jaws 888, 890, to fix the position of the wheel carrier on the bar. The jaws may be formed by a lower, depending portion of base 856.

FIG. 16 shows a bottom view of wheel carrier 846. Clamp 886 may be formed by fixed jaw 888 and slidable jaw 890, which collectively form a cavity between each other to receive load supporting bar 850, with bar 850 extending orthogonally to a long axis 891 of base 856. Fixed jaw 888 may, for example, be formed by body 892, as a downward projection thereof. Slidable jaw 890 may be capable of reciprocative motion, indicated at 914, toward and away from fixed jaw 888, to change the spacing between the jaws. Motion of slidable jaw 890 may be along a linear motion axis 916. The motion axis may be substantially orthogonal to a long axis 918 defined by bar 850 and/or substantially parallel to long axis 891 of base 856. Clamp 886 may be described as a horizontal clamp, meaning that linear motion axis 916 is horizontal when the clamp is mounted on bar 850 and/or when arms 860 are oriented upward in their wheel receiving position.

Slidable jaw 890 may be driven in either direction along motion axis 916 by operation of a drive member 922. The drive member may be a threaded drive member disposed in threaded engagement with slidable jaw 890. For example, drive member 922 may include a threaded rod 924, namely, a drive screw that extends through slidable jaw 890. Drive member 922 may have a substantially fixed axial position in body 892, such that rotation of the drive member causes translational motion of slidable jaw 890 without net displacement of the drive member. The drive member also may include graspable handle or knob 898, which may be turned by hand to rotate threaded rod 924, which adjusts clamp 886.

FIG. 17 shows a longitudinal sectional view of wheel carrier 846. Threaded engagement of threaded rod 924 with slidable jaw 890 is indicated by an arrow at 926.

Clamp 886 may be a "universal" clamp capable of effective engagement of bars having different cross-sectional shapes and/or sizes. To achieve this ability, fixed jaw 888 and slidable jaw 890 may have respective bar-engagement surfaces 930, 932 that are contoured to be wavy or sinuous in profile, to form a plurality of notches 934. More particularly, each surface 930, 932, in profile, may include a plurality of distinct concave and/or convex surface regions having different curvatures, a discernable and/or sharp boundary between adjoining surface regions, different shapes (angular versus curved), and/or the like. In some embodiments, the respective profiles of the fixed and slidable jaws may not (or may) be mirror images of one another. For example, in the present illustration, one of the jaws (fixed jaw 888) presents a more angular profile, while the other of the jaws (slidable jaw 890) presents a more curved profile.

The clamp may have any other suitable configuration. For example, the jaws of the clamp may pivot open and closed in a clamshell arrangement. Alternatively, or in addition, the jaws of the clamp may move relative to another along a vertical axis instead of the horizontal axis shown in FIG. 17.

Wheel carrier 846 may include a lock 940 (e.g., a security lock) that is actuatable to place the lock in a locked position that blocks adjustment of clamp 886 and/or release of latches 906, 908 (see FIG. 16). The lock may include a blocking member or cam 942 that is movable (e.g., pivotable) between locked and unlocked positions. In the locked position, blocking member 942 may be disposed in the rotational path of drive member 922, such as in the path of a fixture 944 that is fixed to threaded rod 924 at a distal end of drive member 922. In some embodiments, blocking member 942 may form a flange 946 that is received in a slot 148 formed in blocking member 942, or vice versa. In any event, blocking member 942 in the locked position may prevent drive member 922 from being turned and thus may prevent adjustment of clamp 886. In other words, the locked position of lock 940 may restrict adjustment of the clamp from a closed position to an open position having a jaw spacing sufficient for disconnection of wheel carrier 846 from bar 850.

Lock 940 may require a security token, such as a key, to pivot blocking member 942 from outside the wheel carrier. For example, blocking member 942 may be attached to a lock core 950, which may be disposed in a lock housing 952. The lock core and its attached blocking member 942 may be pivoted when a matching key is inserted in lock core 950 and turned. Thus, lock 940, in the locked position, may prevent an unauthorized person from opening clamp 886, thereby discouraging theft of the wheel carrier.

Figure 18:
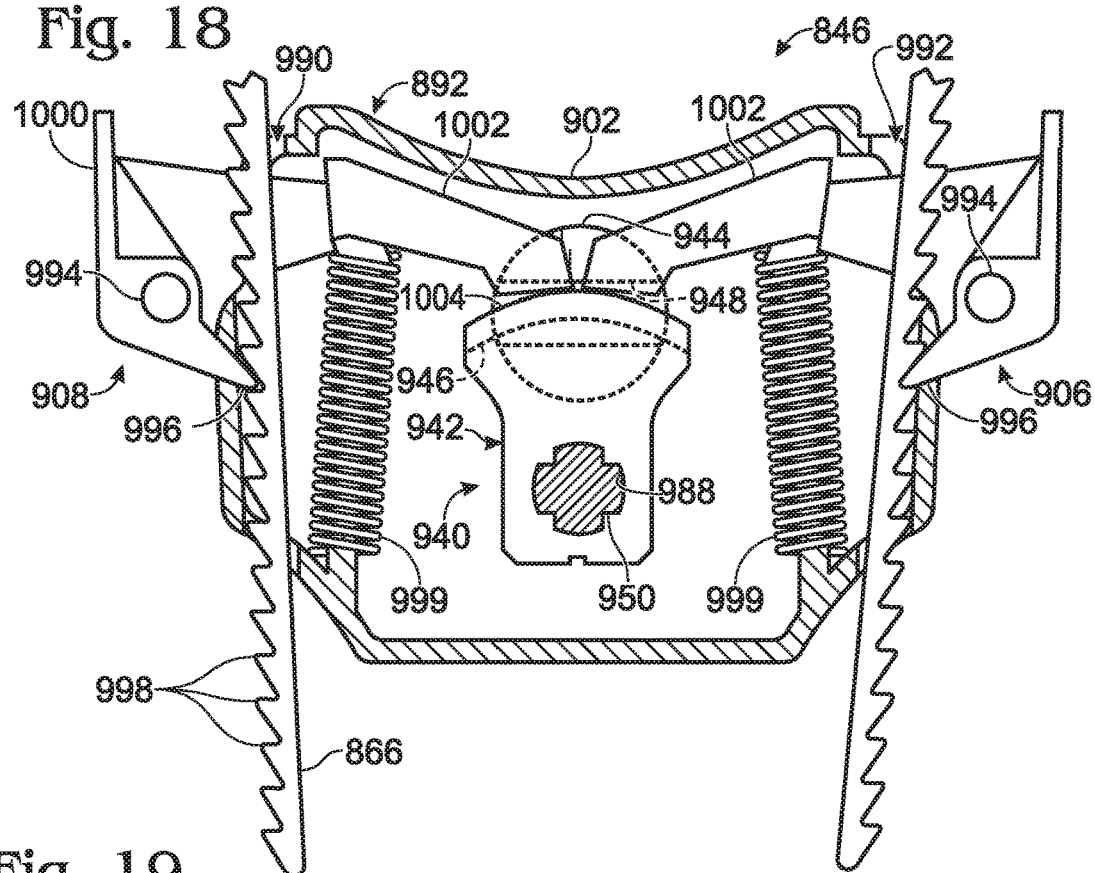
FIGS. 18 and 19 are cross-sectional views of the clamp shown in FIGS. 15-17, illustrating a lock mechanism.

FIG. 18 shows a cross-sectional view of wheel carrier 846 taken through lock 940 with the lock disposed in a locked position. The rotary position of blocking member 942 may be determined by the rotary position of lock core 950, which may be received in an opening 988 defined by the blocking member.

The lock may be flanked by opposing channels 990, 992 defined by openings formed in body 892. Each channel may receive an end of strap 866.

Latches 906, 908 each may be pivotably coupled to body 892 by a respective pin 994. Each latch may include a pawl 996 that is received between adjacent teeth 998 of strap 866, to restrict longitudinal motion of an end region of the strap. Each latch may be connected to a spring 999 that urges pawl 996 into engagement with teeth 998. The teeth may be biased in shape, to selectively permit tightening relative to loosening of the strap. Each latch may include an external lever or tab 1000, to permit a user to pivot pawl 996 out of engagement with the teeth, from outside the wheel carrier. However, each latch also may be equipped with an internal lever 1002 that also controls the ability of the latch to pivot. When blocking member 942 is in the locked position, as in FIG. 18, an end surface 1004 of the blocking member may be situated to obstruct motion of internal lever 1002 that would permit pawl 996 to disengage teeth 998. For example, in the present illustration, end surface 1004 interferes with downward motion of the end of each internal lever 1002, thereby preventing release of strap 866 at both end regions thereof (when both have been secured by their respective latches). In some embodiments, blocking member 942 may function as a cam that bears against internal levers 1002 (e.g., urging them upward in the present illustration), as the lock is placed into the locked position. Accordingly, blocking member 942 may be eccentrically mounted with respect to end surface 1004, such that the distance from the pivot axis of blocking member 942 to distinct circumferential positions of end surface 1004 is variable.

Blocking member 942, while blocking the ability of latches 906, 908 to be released, also may block rotation of fixture 944 of the drive member. As described previously with respect to FIG. 17, flange 946 of blocking member 942 may be received in slot 948 of fixture 944 to prevent the drive member from being rotated. Therefore, lock 940 may act to block removal of strap 866 and adjustment of clamp 886 at the same time, thereby simultaneously preventing theft of the wheel carrier and the wheel.

Figure 19:
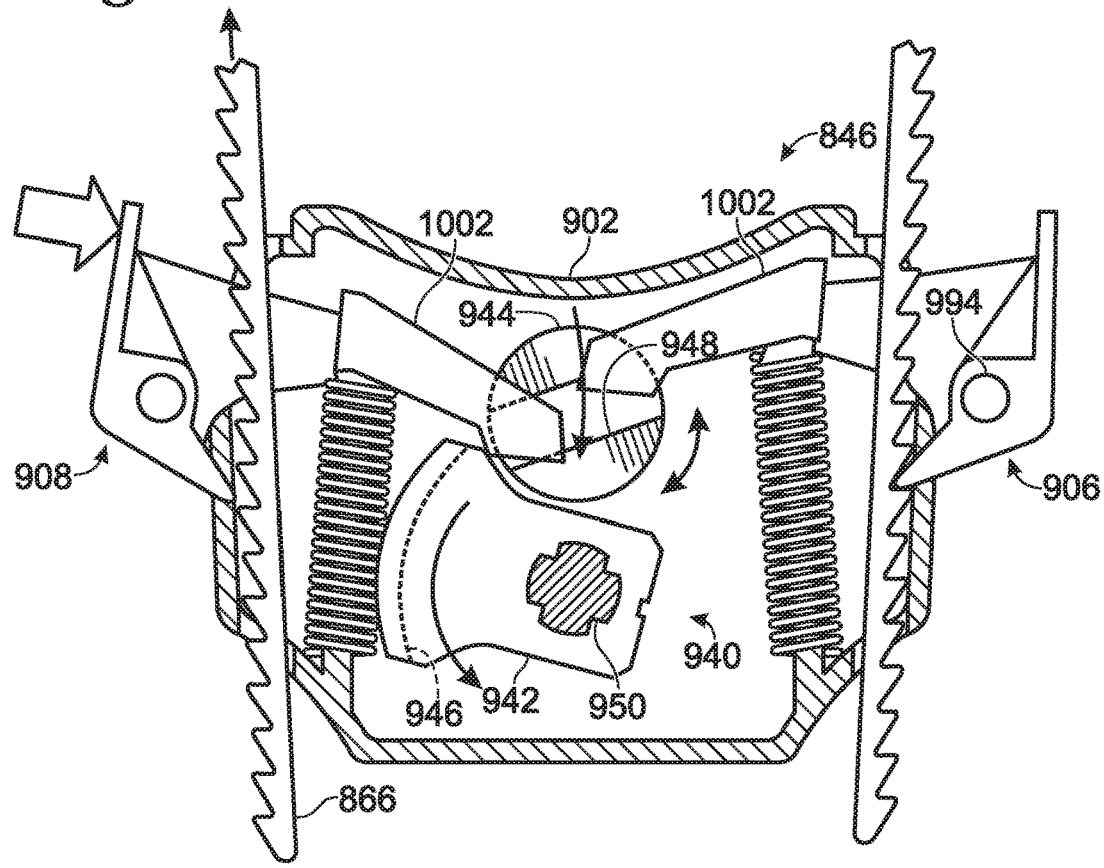

FIG. 19 shows lock 940 disposed in an unlocked position that permits removal of the wheel carrier from the vehicle rack (following permitted adjustment (i.e., opening) of clamp 886) and removal of the bicycle wheel from the wheel carrier (following permitted release of at least one of latches 906, 908). In the unlocked position, blocking member 942 may be pivoted out of the travel paths of latches 906, 908 and fixture 944, thereby permitting pivotal motion of internal levers 1002 that releases latches 906, 908 and also permitted rotational motion of the drive member that opens the jaws of the clamp.

Figure 20:
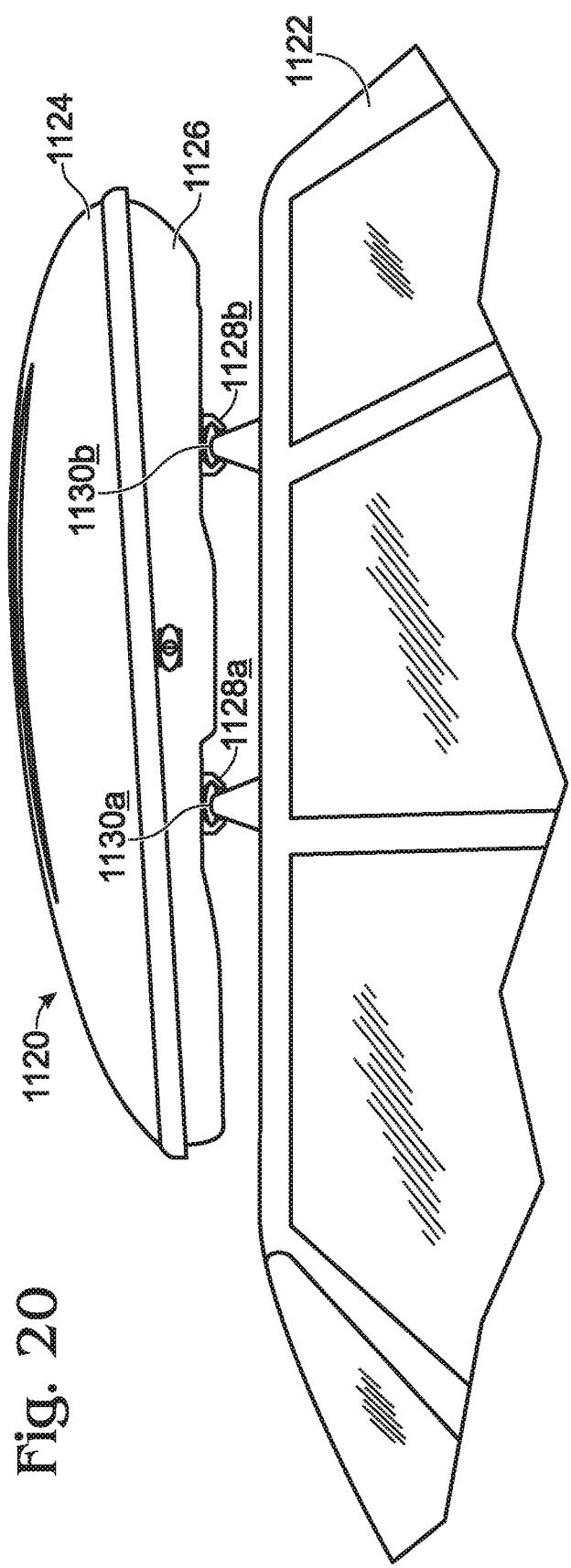
FIG. 20 is a side view of a cargo box clamped to a pair of crossbars.

FIG. 20 shows cargo box 1120 secured to vehicle 1122. Cargo box 1120 has lid 1124 connected to bottom portion 1126. Bottom portion 1126 of cargo box 1120 includes clamps 1128a and 1128b for securing bottom portion 1126 of cargo box 1120 to crossbars 1130a and 1130b, respectively.

Figure 21:
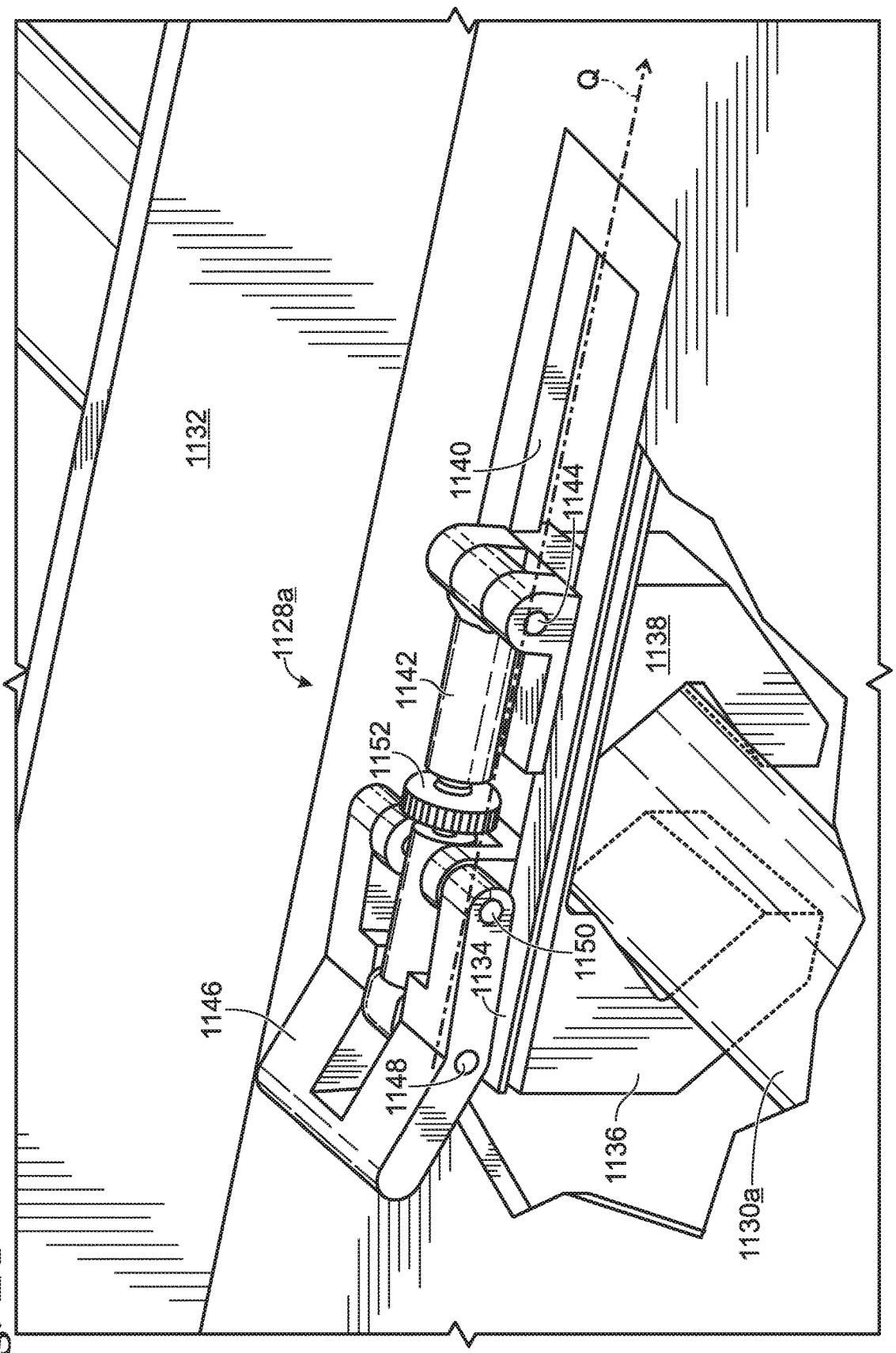
FIG. 21 is a partial perspective view of an alternative clamp configuration for connecting a cargo box to a crossbar.

FIG. 21 shows a partial perspective view of floor 1132 of bottom portion 1126 of cargo box 1120, as shown in FIG. 20. Clamp assembly 1128a is mounted in floor 1132. Clamp assembly 1128a includes base 1134 which remains stationary and fixed in floor 1132. Fixed jaw portion 1136 descends substantially vertically from base 1134 external to box 1120. Sliding jaw member 1138 is slidably connected to base 1134, and also descends vertically for cooperatively gripping crossbar 1130a along with stationary jaw portion 1136. Base 1134 has internal slot or track 1140 for guiding sliding jaw member 1138 along horizontal clamping axis Q. Shaft assembly 1142 has a distal end portion pivotally connected to sliding jaw member 1138 along pivot axis 1144. A proximal end of shaft assembly 1142 is pivotally connected to lever 1146 along pivot axis 1148. Lever 1146 is pivotally connected to base 1134 and/or stationary jaw portion 1136, along pivot axis 1150.

Adjustment device, for example, dial 1152 is provided for adjusting the effective length of shaft assembly 1142 to accommodate crossbars of different shapes and dimensions. Any adjustment device which allows modification of the effective length of shaft assembly 1142 may be used to alter the clamping function to suit different crossbar configurations. For example, dial 1152 may be keyed to a shaft which has a threaded connection to a busing or a nut member along the assembly.

Figure 24:
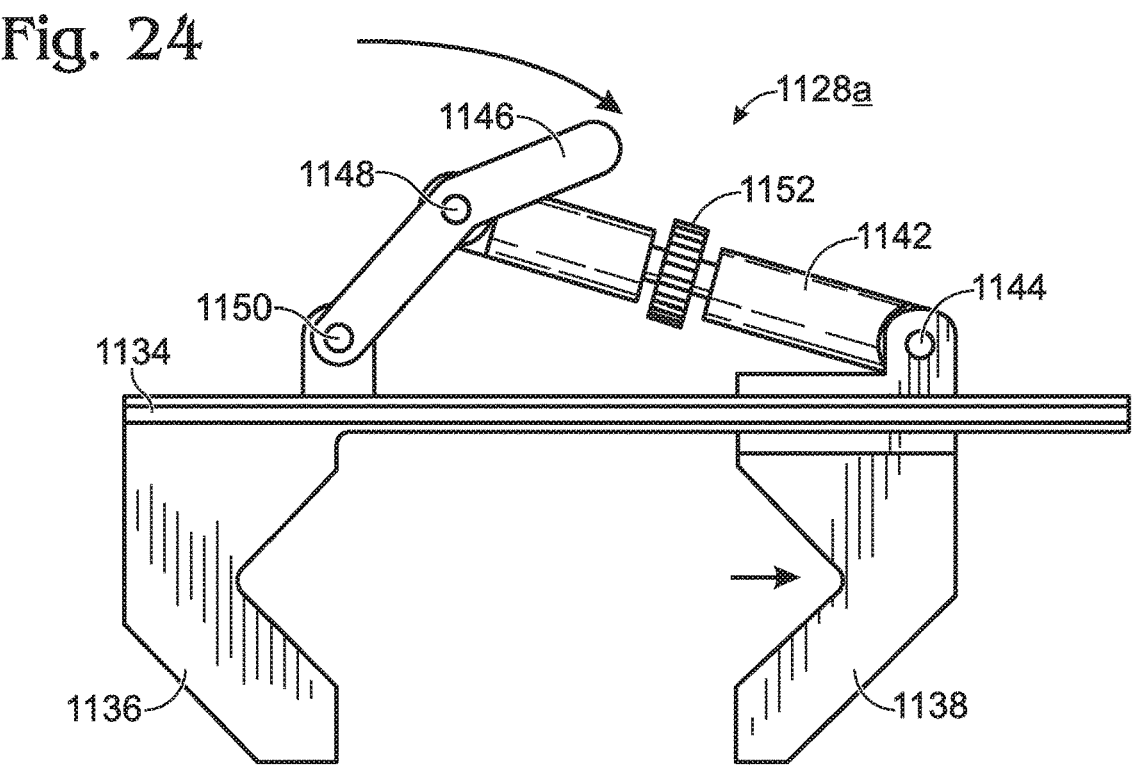

FIGS. 22-24 show side views of clamp 1128a moving from a clamped position, shown in FIG. 22, to an unclamped position, shown in FIG. 24. Similar to FIG. 21, clamp 1128a is mounted in the floor of the cargo box. Clamp 1128a includes base 1134. Stationary jaw portion 1136 descends from base 1134 to an external bottom side of cargo box 1120. Sliding jaw member 1138 also descends from base 1134, and is mounted in a slot or track in base 1134 for guiding horizontal movement of sliding jaw 1138. Adjustable shaft assembly 1142 connects stationary jaw portion 1136 to sliding jaw member 1138 via lever 1146. Shaft assembly 1142 is pivotally connected to sliding jaw member 1138 along pivot axis 1144. The other end of shaft assembly 1142 is pivotally connected to lever 1146 along pivot axis 1148. Lever 1146 is pivotally connected to base 1134 and/or stationary jaw portion 1136 along pivot axis 1150. Adjustment dial 1152 is provided for altering the effective length of shaft assembly 1142 to accommodate crossbars of different shapes and dimensions. Lever 1146 is bent or angled upward to provide easier manipulation, particularly when clamp 1128a is in the clamped position, as shown in FIG. 22. FIG. 23 shows clamp 1128a with lever 1146 partially rotated around pivot axis 1150 in a clockwise direction between clamped and unclamped positions. FIG. 24 shows clamp 1128a with lever 1146 fully rotated around pivot axis 1150 to the unclamped position. As shown in FIG. 24, stationary jaw portion 1136 and sliding jaw member 1138 are moved apart by a maximum distance.

Figure 25:
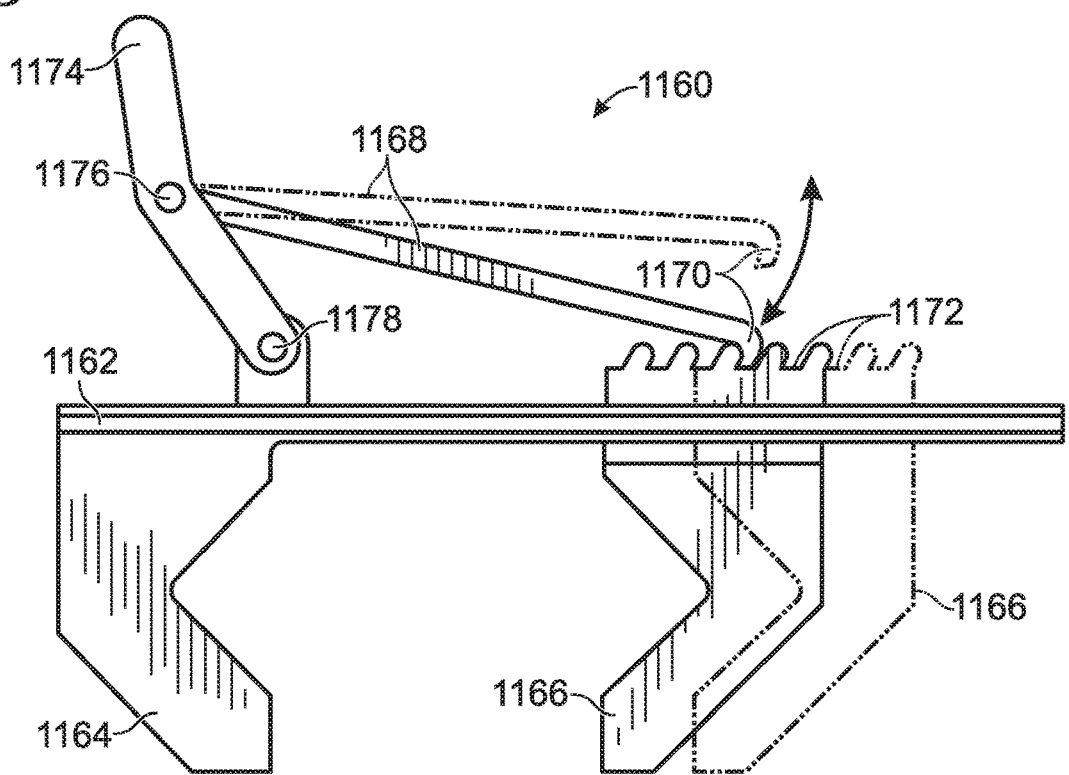
FIG. 25 is a side view of an alternative clamp embodiment for connecting a cargo box to a crossbar.

FIG. 25 shows an alternative clamp assembly 60 for securing a cargo box to a crossbar. Clamp assembly 1160 includes base 1162 which is mounted in the floor of a cargo box. Stationary jaw portion 1164 descends from base 1162. Sliding jaw 1166 is mounted in a slot or track of base 1162, and is permitted to move horizontally, alternately, toward and away from stationary jaw portion 1164. Shaft 1168 has hooked end 1170 for engaging one of multiple grooves 1172 in an upper side of sliding jaw member 1166. The other end of shaft 1168 is pivotally connected to lever 1174 along pivot axis 1176. Lever 1174 is pivotally connected to base 1162 and/or stationary jaw portion 1164 along pivot axis 1178. Similar to clamp assembly 1128a illustrated in FIGS. 21-24, clamp assembly 1160 may be manipulated between clamped and unclamped positions by moving lever 1174 around pivot axis 1178. Clamp assembly 60 may be adapted to accommodate crossbars of different shapes and dimensions by engaging hooked end 1170 of shaft 1168 to selected grooves or notches 1172 on sliding jaw member 1166.

Many alternatives and modifications of the examples described above, are possible and may be advantageous for different applications. For example, most of the examples include a "stationary" jaw combined with a "sliding" jaw. Similar designs may be useful in which both jaws may be movable or slidable along a horizontal clamping direction.

The various structural members disclosed herein may be constructed from any suitable material, or combination of materials, such as metal, plastic, nylon, plastic, rubber, or any other materials with sufficient structural strength to withstand the loads incurred during use. Materials may be selected based on their durability, flexibility, weight, and/or aesthetic qualities.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

We claim:

1. An apparatus for securing cargo to a crossbar on top of a vehicle comprising:
   a pair of crossbars configured for mounting on a vehicle roof generally perpendicular to the direction of vehicle travel, each crossbar having a leading side and a trailing side,
   a cargo supporting device configured to contact and secure cargo on top of a vehicle, the cargo supporting device having a track defining a horizontal linear clamping axis parallel to a direction of vehicle travel, and a first jaw member descending from a bottom side of the cargo supporting device and engaging the leading side of one of the crossbars;
   a second jaw member having a concave internal surface, the second jaw member being configured to move along the track of the cargo supporting device for clamping a crossbar cooperatively with the first jaw member; and
   an actuator connected to the second jaw member and configured to drive movement of the second jaw member along the internal track, the actuator including a threaded shaft extending generally along the clamping axis and engaging corresponding internal threads of the second jaw member such that rotation of the threaded shaft causes movement of the second jaw member along the track relative to the first jaw member while the threaded shaft remains generally axially and angularly fixed along the clamping axis relative to cargo supporting device, the orientation of the second jaw member being fixed except for linear movement along the clamping axis.

2. The apparatus of claim 1, wherein the cargo supporting device is configured to contact and secure a specific type of recreational cargo selected from the following: bicycle, boat, and wheel.

3. The apparatus of claim 1, wherein the first jaw member is molded together with the cargo supporting device.

4. The apparatus of claim 1, wherein the first jaw member is a permanently joined part of the cargo supporting device.

* * * * *